(12) United States Patent
Takayama et al.

(10) Patent No.: US 7,691,213 B2
(45) Date of Patent: *Apr. 6, 2010

(54) CASE HARDENED GEAR AND METHOD OF PRODUCING THE SAME

(75) Inventors: Takemori Takayama, Hirakata (JP); Masanari Furumoto, Takatsuki (JP); Chikara Nakao, Hirakata (JP); Noriko Morioka, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/790,931

(22) Filed: Mar. 1, 2004

(65) Prior Publication Data

US 2004/0256029 A1 Dec. 23, 2004

(30) Foreign Application Priority Data

Mar. 11, 2003 (JP) ............................. 2003-065302
Nov. 4, 2003 (JP) ............................. 2003-374041

(51) Int. Cl.
- C22C 38/24 (2006.01)
- C22C 38/18 (2006.01)
- C22C 38/40 (2006.01)
- C22C 38/46 (2006.01)
- C21D 9/32 (2006.01)
- C21D 1/10 (2006.01)

(52) U.S. Cl. .................... 148/333; 148/334; 148/335; 148/336; 148/332; 148/906; 148/644; 148/586; 148/573; 384/912; 384/625

(58) Field of Classification Search ......... 148/333–335, 148/572, 573–575, 906, 567, 569, 586, 644, 148/320, 328; 384/492, 912, 625

See application file for complete search history.

(56) References Cited

U.S. PATENT DOCUMENTS 3,663,314 A * 5/1972 Monma et al. .............. 148/333

(Continued)

FOREIGN PATENT DOCUMENTS

CN 1380435 A 11/2002

(Continued)

OTHER PUBLICATIONS

Brick et al., Material science and Engineering Series, Martensite transformatin in Iron-Carbon alloys, p. 131., 4th edition, 1977.*

(Continued)

*Primary Examiner*—Deborah Yee
(74) *Attorney, Agent, or Firm*—Frishauf, Holtz, Goodman & Chick, P.C.

(57) ABSTRACT

There is provided an inexpensive rolling element used under high interface pressure such as induction hardened gears, the rolling element being improved in the seizure resistance of its tooth flanks and having a temper hardness of HRC 50 or more at 300° C. To this end, the rolling element is made from a steel material containing at least 0.45 to 1.5 wt % C and one or more alloy elements selected from 0.1 to 0.5 wt % V and 0.3 to 1.5 wt % Cr, and has a rolling contact surface layer having a structure tempered at low temperature in which 2 to 18% by volume cementite disperses in a martensite parent phase formed by induction heating and cooling and containing 0.25 to 0.8 wt % carbon solid-dissolving therein.

23 Claims, 10 Drawing Sheets

U.S. PATENT DOCUMENTS

| | | | |
|---|---|---|---|
| RE28,523 E | 8/1975 | Hill | |
| 3,929,523 A * | 12/1975 | Kinoshi et al. | 148/526 |
| 4,162,157 A | 7/1979 | Parker | |
| 4,173,501 A | 11/1979 | Hildebrandt et al. | |
| 4,992,111 A | 2/1991 | Yamada et al. | |
| 5,085,733 A | 2/1992 | Mitamura | |
| 5,131,965 A | 7/1992 | McVicker | |
| 5,213,634 A | 5/1993 | DeArdo et al. | |
| 5,338,377 A | 8/1994 | Mitamura et al. | |
| 5,413,643 A | 5/1995 | Murakami et al. | |
| 5,725,690 A | 3/1998 | Ochi et al. | |
| 5,906,691 A | 5/1999 | Burnett et al. | |
| 6,171,414 B1 | 1/2001 | Mitamura et al. | |
| 6,224,688 B1 | 5/2001 | Takemura et al. | |
| 6,258,179 B1 * | 7/2001 | Takayama et al. | 148/233 |
| 6,309,475 B1 | 10/2001 | Takayama et al. | |
| 6,413,328 B2 * | 7/2002 | Takayama et al. | 148/319 |
| 6,540,847 B1 | 4/2003 | Beswick | |
| 6,874,943 B2 | 4/2005 | Goto et al. | |
| 6,899,774 B2 | 5/2005 | Takayama | |
| 7,083,688 B2 | 8/2006 | Asano et al. | |
| 7,566,373 B2 | 7/2009 | Takayama | |
| 2002/0029597 A1 * | 3/2002 | Choe et al. | 72/53 |
| 2002/0112787 A1 | 8/2002 | Asano et al. | |
| 2004/0035499 A1 | 2/2004 | Takayama et al. | |
| 2004/0047757 A1 | 3/2004 | Takayama | |
| 2005/0051240 A1 | 3/2005 | Takayama | |
| 2005/0241734 A1 | 11/2005 | Takayama et al. | |
| 2005/0247377 A1 | 11/2005 | Takayama et al. | |
| 2006/0016519 A1 | 1/2006 | Takayama | |
| 2006/0021679 A1 | 2/2006 | Takayama | |

FOREIGN PATENT DOCUMENTS

| | | | |
|---|---|---|---|
| EP | 0 950 723 A1 | | 10/1999 |
| EP | 0950723 | * | 10/1999 |
| EP | 1 273 672 A1 | | 1/2003 |
| JP | 48-23617 A | | 3/1973 |
| JP | 49-7117 A | | 1/1974 |
| JP | 55-12177 B2 | | 1/1977 |
| JP | 57-16186 B2 | | 3/1977 |
| JP | 57-19183 B2 | | 3/1978 |
| JP | 54-10923 B2 | | 5/1979 |
| JP | 54-23329 B2 | | 8/1979 |
| JP | 54-124816 A | | 9/1979 |
| JP | 54-143715 A | | 11/1979 |
| JP | 55-2789 A | | 1/1980 |
| JP | 55-12184 B2 | | 3/1980 |
| JP | 57-10177 B2 | | 2/1982 |
| JP | 57-85953 A | | 5/1982 |
| JP | 57-89424 A | | 6/1982 |
| JP | 57-174434 A | | 10/1982 |
| JP | 5-59427 B2 | | 3/1984 |
| JP | 59-107066 A | | 6/1984 |
| JP | 59-136451 A | | 8/1984 |
| JP | 60-5854 A | | 1/1985 |
| JP | 60-162726 A | | 8/1985 |
| JP | 360162726 | * | 8/1985 |
| JP | 60-215743 | | 10/1985 |
| JP | 61-9555 A | | 1/1986 |
| JP | 62-218542 A | | 9/1987 |
| JP | 64-4459 A | | 1/1989 |
| JP | 5-32462 B2 | | 7/1989 |
| JP | 2-175836 A | | 7/1990 |
| JP | 2-185954 A | | 7/1990 |
| JP | 4-2173241 A | | 7/1990 |
| JP | 03-061348 A | | 3/1991 |
| JP | 7-74380 B2 | | 10/1991 |
| JP | 05-078781 | | 3/1993 |
| JP | 3227730 B2 | | 3/1993 |
| JP | 06-017224 A | | 1/1994 |
| JP | 6-25736 A | | 2/1994 |
| JP | 406025736 | * | 2/1994 |
| JP | 8-3629 A | | 1/1996 |
| JP | 08-073929 A | | 3/1996 |
| JP | 08-104924 A | | 4/1996 |
| JP | 8-109435 | | 4/1996 |
| JP | 9-111403 | | 4/1997 |
| JP | 9-111405 A | | 4/1997 |
| JP | 10-176219 A | | 6/1998 |
| JP | 10-259470 A | | 9/1998 |
| JP | 11-117059 A | | 4/1999 |
| JP | 11-222627 A | | 8/1999 |
| JP | 2000-204464 A | | 7/2000 |
| JP | 2000-265241 A | | 9/2000 |
| JP | 2000-301458 A | | 10/2000 |
| JP | 2002-030344 A | | 1/2002 |
| JP | 2002-121645 | | 4/2002 |
| JP | 2002-180183 A | | 6/2002 |
| JP | 2003-027181 A | | 1/2003 |
| JP | 2003-328078 A | | 11/2003 |
| JP | 2004-076125 A | | 3/2004 |

OTHER PUBLICATIONS

English abstract of Japanese patent 408081738, Tatsumi Urita et al, Mar. 26, 1996.*

Brick et al., "Structure and Properties of Engineering Materials," Martensite Transformation in Iron-Carbon Alloys, 4th Edition, (1978), pp. 152-154.

Related U.S. Appl. No. 10/790,959, filed Mar. 1, 2004; T. Takayama et al.; Rolling Element and Method of Producing the Same.

Heat Treatment of Steel (5th Edition); Edited by the Iron and Steel Institute of Japan, Mar. 15, 1985; pp. 44-46; 110.

K. Komine et al; On Relationship Between Half Value Breadth and Hardness of Quenched-Tempered Steels; Materials vol. 26, No. 280, p. 26 issued by Society of Materials, Japan, pp. 24-30, Jan. 15, 1977.

J.R. Davis, "ASM Metals Handbook", Second Edition, (1998).

"Heat Treatment of Steel: basis and operation standard," *Iron and Steel Institute of Japan*, Maruzen Co., Ltd., Feb. 20, 1978, p. 110, Table 2.38 and Table 2.39, pp. 257-259, Fig. 5.85 (and a partial English-language translation thereof).

* cited by examiner 4 (b)

4 (a)

5 (a)

5 (b)

5 (c)

FIG. 10
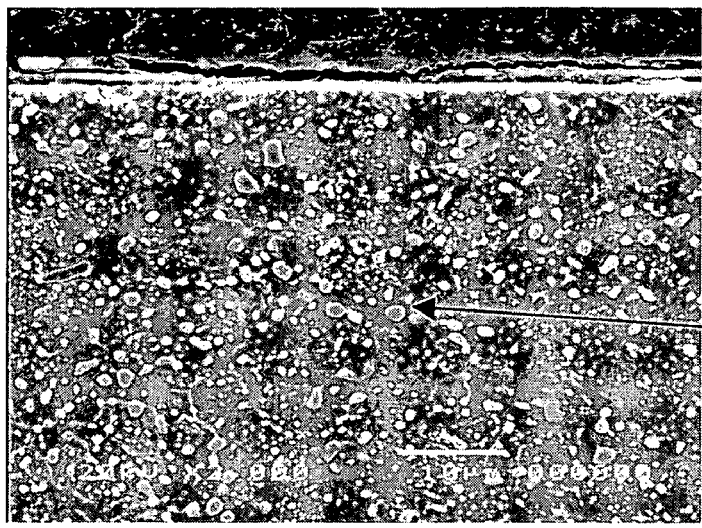
GRANULAR CEMENTITE
8.8 wt% Cr
FIG. 10 (a)
PEARLITIC CEMENTITE
3.9 wt% Cr
GRANULAR CEMENTITE
7.4 wt% Cr
FIG. 10 (b)

CASE HARDENED GEAR AND METHOD OF PRODUCING THE SAME

TECHNICAL FIELD

The present invention relates to a rolling element such as gears and a method of its production, the rolling element being produced by quench hardening its rolling contact surface layer through induction hardening treatment to enhance pitting resistance.

BACKGROUND ART

Up to now, there have been commonly used, in the reducers of construction machines and earth-moving machines, gears produced by applying carburizing/quenching or carbonitriding/quenching to Scr-based, SCM-based or SNCM-based low carbon steel, since high contact fatigue strength (no less than 200 kgf/mm$^2$) is considered to be an important factor. Some gears used under comparatively low interface pressure (up to 150 kgf/mm$^2$) are produced by applying thermal treatment such as induction hardening to steel having a carbon concentration of 0.35 to 0.55 wt % and suited for induction hardening (see "Heat Treatment for Steel" (revised edition No. 5, p110, Tables 2-38, 2-39) edited by The Iron and Steel Institute of Japan, Publication Office: Maruzen Co., Ltd.).

Reducers employed in construction machines and earth-moving machines require less expensive gears having higher strength and higher resistance to interface pressure, because of the recent tendency to higher output power and compactness.

Construction machines and earth-moving machines often stride obstacles such as rocks and structures during traveling and break up such obstacles while making a turn. Therefore, the gears of the reducer used for running and turning the vehicle body receive impulsive load. Under such a condition, carburized/quenched gears are susceptible to damage.

Induction hardened gears have higher toughness than carburized/quenched gears, but where induction hardened gears are used under a high interface pressure of 150 kgf/mm$^2$ or more as noted earlier, defects in terms of contact fatigue strength (e.g., pitting, scuffing and premature wear of tooth flanks) are likely to occur.

The invention is directed to overcoming the above problems and therefore the invention aims to reduce local adhesion occurring during the rolling and sliding movement of a gear by dispersing undissolved fine cementite in austenite through induction hardening of the rolling contact surface. This idea is conceived from the fact that the temperature of the tooth flanks of a gear used under a rolling/sliding condition increases up to 300° C. owing to wear and heat generation caused by local adhesion that occurs in a boundary-lubrication condition. The invention also aims to provide an inexpensive rolling element for use under high interface pressure such as induction hardened gears, the rolling element having a temper hardness of HRC 50 or more at 300° C. Such a rolling element is produced from a steel material containing a large amount of Al and/or Si which effectively enhances temper softening resistance in low-temperature tempering at 300° C. Another object of the invention is to improve the seizure resistance of the tooth flanks of a gear by dispersing, into the tooth flanks beforehand, 0.1 to 0.5% by volume one or more kinds of compounds selected from the carbides, nitrides and carbonitrides of Ti, Zr, Nb, Ta and Hf which hardly solid-dissolve in austenite. A further object of the invention is to provide a rolling element exerting high toughness even in a highly hardened condition and the producing method thereof, the rolling element being achieved by more adequate co-addition of Al and Ni.

DISCLOSURE OF THE INVENTION

SNCM815, SCM420, SCr420, SMnB420 steels (carburized case-hardened steels) which had been subjected to carburizing/quenching were preliminarily checked in terms of rolling contact fatigue strength (pitting resistance) at interface pressures of 375 to 220 kgf/mm$^2$ under a rolling/sliding condition. As a result, it was found that the interface pressure at which pitting appeared after 10$^7$ rotations was 210 kgf/mm$^2$ and the X-ray half value width of the martensite phase of the outermost layer of the rolling contact surface in which pitting occurred under each interface pressure decreased to 4-4.2°, and significant softening was observed at the outermost layer of the rolling contact surface of each steel.

An S55C carbon steel which had been subjected to quenching/tempering so as to have HRC 61 to 62 was preliminarily checked in terms of rolling contact fatigue strength at an interface pressure of 250 kgf/mm$^2$. As a result, it was found that the interface pressure at which pitting appeared after 10$^7$ rotations was about 180 kgf/mm$^2$ and the X-ray half value width of the martensite phase of the rolling contact surface in which pitting occurred under an interface pressure of 250 kgf/mm$^2$ decreased to 3.6-4.20 similarly to the above-described carburized, case-hardened steels.

A preliminary test was also conducted on an eutectoid carbon steel ① (0.77 wt % C) to check its rolling contact fatigue strength. As a result, it was found that the interface pressure at which pitting appeared after 10$^7$ rotations was about 230 to 240 kgf/mm$^2$ which was substantially the same as the rolling contact fatigue strength of the aforesaid carburized, case-hardened steels having substantially the same carbon content. Also, a decrease in rolling contact fatigue strength due to its variation was observed in the carburized case-hardened steels because of the presence of an intergranular oxidation layer and a slack-quenched layer in the rolling contact surface.

A preliminary test was further conducted on a spheroidal eutectoid carbon steel ② (0.85 wt % C, 0.43 wt % Cr), whose rolling contact surface had been subjected to induction hardening, to check its rolling contact fatigue strength and it was found that the interface pressure at which pitting appeared after 10$^7$ rotations was about 260 to 270 kgf/mm$^2$ and this eutectoid carbon steel ② had higher rolling contact fatigue strength than the former eutectoid steel ①(0.77 wt % C) because of the dispersion of about 2% by volume of fine cementite particles in the martensite phase of the rolling contact surface.

From the viewpoint of the dispersion of fine cementite particles (about 2% by volume) and achievement of increased martensitic hardness, a SUJ2 containing about 1.0 wt % carbon and 1.5 wt % Cr was quenched from 840° C. and then tempered to have HRC 62.5. The rolling contact fatigue strength of this steel was checked in a preliminary test and it was found that the interface pressure at which pitting appeared after 10$^7$ rotations was about 270 kgf/mm$^2$ which was approximately the same as that of the above eutectoid steel and that the X-ray half value width of the martensite phase of the rolling contact surface in which pitting occurred decreased to 4.2-4.5° similarly to the carburized, case-hardened steels described above. Further, the rolling contact fatigue strength of another SUJ2, which had been spheroidized and induction hardened at a heating temperature of 950 to 980° C. with a view to dispersing a larger amount of fine cementite particles, was found to be increased to 290 kgf/mm² compared to the above-described SUJ2 quenched from 840° C. The reason for this is that about 10% by volume fine cementite particles disperse in the martensite phase of the rolling contact surface.

Further, carbon steels having carbon contents of 0.46, 0.55, 0.66, 0.77 and 0.85 wt % respectively were quenched from a temperature of 820° C. and tempered at 100 to 350° C. for 3 hours. Then, the hardness and X-ray half value width of each steel were checked. After the test result was studied using, as a reference, published data on these steels (e.g., "Materials" Vol. 26, No. 280, P26), it was found that the hardness when the X-ray half value width of the martensite phase is 4 to 4.2° corresponds to a temper hardness of about HRC 51 to 53. Taking account of the fact that the surface carbon concentrations of the carburized, case-hardened steels were adjusted to about 0.7 to 0.9 wt %, the tempering temperature was found to be about 300° C.

It is obvious from the preliminary tests described above that the outermost surface of a tooth flank is tempered and softened by heat generated at the time when the gears come into engagement under high interference pressure so that pitting occurs, and that as an index, a 300° C.-temper hardness of HRC 53 or more is necessary for obtaining the same level of pitting resistance as that of carburized quenched gears.

From the comparison between the 300° C.-temper hardness of the carburization-hardened layer of the SCM420 steel which has undergone carburizing/quenching and the 300° C.-temper hardness of the eutectoid carbon steel which has undergone quenching only, it has been understood that since virtually no improvement in temper softening resistance was observed when Cr and Mo were added, a new alloy design intended for increasing temper softening resistance during low-temperature tempering at about 300° C. is necessary in order to achieve pitting resistance equal to or higher than that of carburized, quenched gears by induction hardening. Also, dispersion of fine cementite particles or the like having a particle diameter of 0.1 to 1.5 μm in the martensite phase has proved effective for attaining improved contact fatigue strength, as seen from the cases of the eutectoid carbon steel ② (0.85 wt % C) and SUJ2 which were improved in rolling contact fatigue strength.

The seizure resistance of the rolling contact surface during sliding with the interface being in a boundary-lubrication condition can be significantly improved by dispersion of hard cementite. More particularly, cementite dispersion leads to a drop in the temperature of the outermost layer of the rolling contact surface and to improved wear resistance, so that the seizure resistance is improved (this is hereinafter called "the hard particle dispersion effect"). It is known that this effect is attained by dispersion of 0.1% by volume or more hard particles.

As an induction hardened gear design value which provides pitting resistance equal to or higher than the pitting resistance obtained by the carburizing/quenching treatment (interface pressure Pmax=230 kgf/mm² or more) described earlier, the hardness which can withstand fatigue caused by pulsating shear stress (R=0) which is 0.3 times the value of interface pressure may be set based on the theoretical analysis of Hertz's contact pressure. Its calculated value is approximately HRC 53.4 which coincides with the hardness (HRC=53) obtained from the X-ray half value width of the martensite phase of the rolling contact surface in which occurrence of pitting was observed in the above-described preliminary test. Since pitting occurs at the time when the temperature of the outermost portion of the rolling contact surface increases to about 300° C. owing to friction heat generated by the rolling/sliding movement of the rolling element, it has been found that a highly pressure-resistant gear having contact fatigue strength equal to or higher than that of carburized quenched gears can be developed by at least setting the 300° C.-temper hardness to HRC 53 t or more which can withstand Pmax=230 kgf/mm².

As will be described in Example 2, the 300° C.-temper hardness of the martensite phase of a carbon steel containing 0.1 to 1.0 wt % carbon is described by:

$$HRC = 36 \times \sqrt{C(\text{wt }\%)} + 20.9$$

After checking, based on the above hardness, the influences of various alloy elements upon the hardness of a martensite phase after tempering at 300° C., it has become apparent that the hardness of a martensite phase after tempering at 300° C. is represented by:

$$HRC = (36 \times \sqrt{C(\text{wt }\%)} + 20.9) + 4.33 \times Si(\text{wt }\%) + 7.3 \times Al(\text{wt }\%) + 3.1 \times V(\text{wt }\%) + 1.5 \times Mo(\text{wt }\%) + 1.2 \times Cr(\text{wt }\%) \times (0.45 \div C(\text{wt }\%))$$

Above all, Si and Al which concentrate in ferrite exhibit remarkable temper softening resistance.

In the invention, the amount (wt %) of each alloy element contained in the above steels is determined as follows based on the above-described result.

To sum up, according to the invention, there is provided a rolling element which is made from a steel material containing at least 0.45 to 1.5 wt % C and one or more alloy elements selected from 0.1 to 0.5 wt % V and 0.3 to 1.5 wt % Cr, and which has a rolling contact surface layer having a structure tempered at low temperature in which 2 to 18% by volume cementite disperses in a martensite parent phase formed by induction heating and cooling and containing 0.25 to 0.8 wt % carbon solid-dissolving therein.

It is well known that the above-described hard particle dispersion effect starts to work when the amount of the dispersing hard particles is 0.1% by volume or more and the hardness of the cementite is substantially Hv 850 to 1000 which does not largely differ from the hardness of the martensite parent phase and therefore causes a less probability of attacking the mating member. In view of the dispersion amount of the cementite contained in the induction hardened rolling contact surface layer of SUJ2, an effective dispersion amount of cementite is 0.2 to 18% by volume. The lower limit of the dispersion amount of the cementite is preferably 2% by volume and more preferably 5% by volume. The upper limit of the dispersion amount of the cementite is 18% by volume. This value is obtained by calculating the amount of the cementite dispersing in the martensite parent phase in which 0.3 wt % carbon solid-dissolves, on assumption that the upper limit of the amount of carbon necessary for restraining generation of huge carbides at the time of steelmaking is 1.5 wt %. The lower limit of the carbon concentration of the martensite phase is 0.25 wt % or more in order to obtain a hard martensite phase having Hv 600 or more in a quenched state, and more preferably 0.3 wt % or more. The upper limit of the carbon content is 0.8 wt % with which the hardness of the martensite phase is saturated. When taking account of the possibility of occurrence of crack during quenching and the heat crack resistance generated during sliding, the upper limit of the carbon content is less than the eutectoid carbon concentration of the steel material used. More concretely, it is preferably no more than 0.6 wt % that is within a hypoeutectoid carbon concentration region.

The heating temperature of the induction hardening treatment is 900 to 1100° C. which is extremely high, compared to the carburizing quenching temperature and furnace heating quenching temperature. It is therefore difficult to form a quench hardened layer in which cementite is dispersed, while controlling the carbon concentration of the martensite phase of the surface layer of the rolling element produced, for example, from the above steel for induction hardening. To solve this problem, the invention is designed such that a steel material containing Cr and V which are alloy elements capable of significantly condensing in cementite is used and such that when the steel material is in a heated state where a ferrite phase (αFe phase) and/or austenite phase (γFe phase) coexists with cementite, a preheating treatment is applied to increase the amount of Cr contained in the cementite of the steel to at least 2.5 wt % or more preferably 3 wt % or more, whereby solid-dissolving of the cementite into the austenite phase during the heating process of the induction hardening is inhibited.

Preferable examples of the above-described heating treatment prior to the induction hardening are (i) a treatment for heating a martensitic or pearlitic structure in the two phase (ferrite+cementite) region; (ii) a technique in which cooling is slowly carried out, for example, by air cooling or furnace cooling at the stage of formation of a pearlitic structure; (iii) constant temperature treatment within the temperature range of the A1 temperature to 600° C.; and (iv) spheroidizing annealing treatment for spheroidizing cementite (see "Heat Treatment for Steel" (p44-46) edited by The Iron and Steel Institute of Japan).

In the case of a steel having carbon concentration equal to or higher than the eutectoid carbon concentration, it is desirable to employ a preheating treatment in which the steel is heated to and kept in the range of the A1 temperature to the Acm temperature in the two phase (austenite+cementite) region and cooling is carried out after condensing Cr into the cementite so that the parent phase is made to have a martensitic, bainitic and/or fine pearlitic structure. It is also desirable to employ such a treatment that after heating the steel to and keeping it in the above temperature region, granular cementite and/or pearlitic cementite is dispersed while slowly cooling the steel to 600° C. The Cr concentration of the cementite having a temperature of 750 to 850° C. in the two phase (austenite+cementite) region is about 8 to 10 times the Cr concentration of the austenite. For instance, in the case of an Fe—0.9 wt % C—1.5 wt % Cr steel, a structure in which about 2% by volume cementite containing 11 wt % Cr is dispersed is obtained by heating the steel to and keeping it at 820° C. and the cementite dispersing in this condition is allowed to remain without solid-dissolving by induction hardening as described later.

It is known that the Cr concentration of the cementite of a steel having a two phase (ferrite and cementite) structure is about 28 times the Cr concentration of the ferrite when the steel is heated for example to 700° C. (when the steel is heated to 600° C., the Cr concentration of the cementite is about 52 times that of the ferrite). This cementite in which Cr is condensed solid-dissolves in the austenite being heated in the course of induction hardening. The solid-dissolving mechanism (speed) of the cementite when the cementite containing Cr solid-dissolves in the austenite being heated in the course of the induction hardening treatment can be explained from the relationship between the Fe—C—M (M is an alloy element) ternary system phase diagram shown in FIG. 1 (heating temperature is a parameter) and the iso-activity lines for carbon (iso-carbon-activity graph) plotted in FIG. 1.

FIG. 1 graphically shows an Fe—C—M ternary system phase diagram of steel materials to which an alloy element similar to Cr having strong affinity with respect to carbon is added. In this diagram, the activity of carbon contained in the steel having the composition indicated by the point A changes as indicated by an upward-sloping curve (the thin line passing through the point A in FIG. 1), because the carbon activity drops with addition of the element M. This iso-carbon-activity line intersects the solid solubility line of cementite at the intersection point B which is linearly connected to the cementite composition point C indicative of a cementite composition containing the element M that is in equilibrium with the intersection point B.

Other iso-carbon-activity lines (other thin lines in FIG. 1) are calculated based on the carbon activities of other steel materials. The higher carbon concentration is, the greater carbon activity is. The solid solubility (the point D) of graphite on the Fe—C axis (Fe—C binary system) is defined by carbon activity Ac=1.

The ferrite composition and cementite composition of the structure before quenching of the steel material having the composition indicated by the point A of FIG. 1 are given by the points E and F, respectively. The cementite having the composition F which has been rapidly heated to a quenching temperature leaves the alloy element M in situ while only carbon having great diffusivity rapidly solid-dissolves in the austenite. In this case, since the carbon activity of the austenite interface composition indicated by the point G that is locally in equilibrium with the cementite interface is greater than the carbon activity of the point A indicative of the composition of the steel material, carbon rapidly diffuses because of the gradient of the chemical potential of carbon. After carbon is homogenized (indicated by arrows ←→) along the iso-carbon-activity line of FIG. 1 at the positions where the cementite solid-dissolves and where ferrite preexists, the alloy element is homogenized.

If the alloy element is added in a larger amount to the steel (the point H) and therefore a larger amount of the alloy element is condensed in the cementite (the point J), the carbon activity (the point K) of the austenite, which is in equilibrium with the cementite when only carbon solid-dissolves, leaving the alloy element M in situ, becomes lower than the carbon activity of the original composition indicated by the point A. It is understood from this fact that although carbon diffuses within a very short time in accordance with the iso-carbon-activity line passing through the point K, the solid-dissolving proceeds to a further extent and that unless the alloy element diffuses from the point K to the point B in accordance with the solid solubility line of the cementite while the cementite is solid-dissolving, the cementite cannot completely solid-dissolve. Specifically, the solid-dissolving of the cementite slows down rapidly while its rate being controlled by the diffusion of the alloy element M. It is further understood that complete solid-dissolving of the cementite is delayed as the difference between the alloy element concentration of the intersection point B of the iso-carbon-activity line passing through the original composition point C and the cementite solid solubility line and the alloy element concentration of the cementite increases and that the cementite is easily dispersed by induction heating and quenching.

In the case of induction heating and quenching in which heating in the austenite (γ phase) region is controlled to be done within several seconds, the carbon concentration of the martensite parent phase containing cementite dispersed in a non-solid-dissolving condition becomes substantially equal to the carbon concentration of the position corresponding to the alloy composition of the point I on the iso-carbon-activity line which passes through the point K dependent of carbon diffusion, and martensite hardness in compliance with this is obtained. However, the hardenability of the martensite parent phase is dependent of the alloy concentration (the point I) of the prior ferrite and the above carbon concentration and is much lower than the hardenability (DI value) calculated from the composition (the point H) of the steel material. It is also obvious that the dropping rate of hardenability increases as the alloy element concentration of the cementite of the structure before quenching increases. Addition of alloy elements (e.g., Cr, Mn and Mo) which are more easily concentrated in cementite is more likely to cause a significant drop in hardenability.

For concrete explanation, there will be discussed an induction hardening treatment in which heating to 1000° C. is quickly carried out followed by quenching, with reference to the Fe—C—Cr ternary system phase diagram and iso-carbon-activity graph (at 1000° C.) of FIG. 2.

(1) A case where cementite rapidly solid-dissolves (i.e., where the Cr concentration of cementite is low)

If the steel indicated by the point A (0.8 wt % C and 0.4 wt % Cr) of FIG. 2 is sufficiently heated to 700° C. in the (cementite+ferrite) coexisting region, it will have the compositions indicated by the point B (cementite: 2.6 wt % Cr) and the point C (ferrite: 0.09 wt % Cr). If the steel is rapidly heated from the above condition, for example, by induction heating to 1000° C. at which it comes into an austenitic state, the compositions indicated by the points B and C will be homogenized, approaching to the point A. However, while the alloy element contained in the cementite of the point B hardly diffuses within the austenite, carbon rapidly diffuses in the austenite (point C) which previously had a ferrite composition, after passing through the point D as indicated by the arrows (↑↓). After the cementite is solid-dissolved, carbon is equilibrated on the iso-activity line of carbon (iso-carbon-activity line) that passes the point A and the element Cr is homogenized toward the point A by subsequent heating, so that more rapid solid-dissolving of the cementite can be accomplished. Further, the carbon concentration of the martensite parent phase becomes substantially equal to the carbon concentration of the point A, so that harder martensite can be obtained.

(2) A case where solid-dissolving of cementite is significantly delayed—1

If the steel indicated by the point E (0.8 wt % C, 1 wt % Cr) of FIG. 2 is sufficiently heated to 700° C. in the cementite/ferrite coexisting region, the steel will have the compositions indicated by the point G (ferrite: 0.24 wt % Cr) and the point F (cementite: 6.61 wt % Cr). If the steel is rapidly heated from this condition, by e.g., induction heating, to 1000° C. at which it comes into an austenitic state, the point F will solid-dissolve, approaching to the point H similarly to the foregoing case. However, since the carbon activity of the composition indicated by the point H (the austenitic interface having carbon activity equivalent to that of the cementite when it solid-dissolves) becomes lower than that of the previous composition indicated by the point E, the cementite first solid-dissolves in accordance with the diffusion rate controlling mechanism of carbon until the iso-carbon-activity line passing through the point H is reached. Thereafter, the γ phase composition (the point H) in equilibrium with the cementite causes the cementite to solid-dissolve along the cementite solid solubility line to the point I on the cementite solid solubility line, while Cr diffusing. It should be noted the carbon activity of the point I is equivalent to the carbon activity of the point E. When the austenite (γ) composition has reached the point I, the cementite completely solid-dissolves. The carbon concentration of the martensite parent phase after quenching becomes about 0.6 wt % and the Cr concentration of it becomes 0.24 wt %. It is understood that about 3% by volume cementite disperses in a non-solid-dissolving condition in the very hard martensite and that the hardenability (DI value) of the martensite phase decreases to a value that is about one fifth the DI value of the composition of the steel (the point E: 0.8 wt % C and 1 wt % Cr). Since the dissolving portion around the non-solid-dissolving cementite has high carbon concentration and high alloy concentration, a stable retained austenite is likely to be formed around the non-solid-dissolving cementite and formation of a slack quenched layer from the non-solid-dissolving cementite interface is restrained.

(3) A case where solid-dissolving of cementite is significantly delayed—2

In the case (2), the point H is established on assumption that $Cr_7C_3$ carbide differing from cementite is in equilibrium with austenite (γ phase) and a two-phase equilibrium between nonequilibrium cementite and austenite (γ phase) is possible in the process of solid-dissolving of cementite. In the solid-dissolving process of cementite, cementite solid-dissolves at the rate controlled by carbon diffusion up to the iso-carbon-activity line (about 0.2) that passes through the point J on the $Cr_7C_3$ carbide solid solubility line. After that, the solid-dissolving of the cementite is further delayed because a restraint is imposed on the austenite (γ phase) interface composition in order to eliminate the need for formation of $Cr_7C_3$ carbide before disappearance of the cementite, the restraint being such that the steel should reach the point K of a three phase (austenite (γ phase)+cementite+$Cr_7C_3$) coexisting region at which at least there is no need to precipitate $Cr_7C_3$ carbide. In this case, the carbon concentration of the martensite parent phase obtained by induction heating and quenching is about 0.45 wt % and about 5% by volume cementite is dispersed in a non solid-dissolving condition within a hard martensite parent phase (HRC 57 to 61).

As obvious from the study described above, the critical point at which a remarkable delay occurs in the solid-dissolving of cementite is when the Cr concentration of cementite is about 3 wt % (the point J) at a heating temperature of 1000° C. and when it is about 2.5 wt % at a heating temperature of 900° C. For instance, the Cr concentration of the cementite of a steel containing 0.55 wt % C and 0.3 wt % Cr when heated to 700° C. is 2.6 wt % that is obtained by calculation with the following equation:

The Cr concentration of cementite=αKCr×the Cr concentration of steel/(1−(the carbon concentration of steel/6.67)×(1−αKCr))

It is therefore understood that the lower limit of Cr is about 0.3 wt % and more preferably 0.4 wt % or more. In the above equation, αKCr is a distribution coefficient representing the condensability of Cr between the ferrite phase and cementite and defined by: distribution coefficient αKM=the M element concentration (wt %) of cementite÷the M element concentration (wt %) of ferrite. The distribution coefficients (at 700° C.) of the alloy elements are as follows.

αKCr=28, αKMn=10.5, αKV=9.0, αKMo=7.5, αKW=2.0, αKNi=0.34, αKSi, Al≈0

Of these alloy elements, Cr concentrates in cementite to the highest degree.

For applying the induction heating (900 to 1100° C.) and quenching technique to manufacture of a rolling element, the hardness of the martensite parent phase which has undergone low-temperature tempering treatment at 140° C. or more after quenching needs to be increased to HRC 55 or more. Therefore, it is necessary to adjust the average Cr concentration of cementite to 10 wt % or less (e.g., the point L in FIG. 2) in order to increase the carbon concentration of the martensite parent phase to 0.3 wt % or more. In view of this, the average Cr concentration of the cementite of the structure before induction hardening is adjusted in the range of 2.5 to 10 wt % in the invention.

The Cr concentration of the cementite heated to and kept in the two phase (austenite+cementite) region as described earlier is about 11 wt % and this cementite is dispersed in a non solid-dissolving condition by induction hardening. However, cementite in equilibrium with ferrite is also precipitated in the structure before induction hardening. In the invention, the Cr concentration of cementite is defined by the average concentration of these cementites and with this Cr concentration, the carbon concentration of the martensite parent phase becomes 0.3 wt % or more. It is more desirable to increase contact fatigue strength by setting the carbon concentration of the martensite parent phase to 0.4 wt % or more. A preferable average Cr concentration of the cementites at that time is 2.5 to 9 wt %.

If the carbon concentration of the martensite parent phase when cementite diffuses and solid-dissolves at the aforesaid rate controlled by carbon diffusion becomes about 0.8 wt % or more, a retained austenite phase will be excessively formed by the induction heating and quenching and the hardness of the martensite phase will be saturated. Therefore, the carbon concentration is preferably adjusted in the range of 0.3 to 0.8 wt %. Where the amount of the non-solid-dissolving cementite is 1 to 18% by volume, the carbon content of the steel material is 0.45 to 1.5 wt % and more preferably 0.53 to 1.5 wt %.

The amount of Cr when 0.53 to 1.5 wt % carbon is added is preferably adjusted to 1.8 wt % or less. In view of economical efficiency, a preferable amount of Cr is 1.5 wt % or less. Where the above-described steel material is used as a gear material as described later and a gear having a quench hardened layer formed along the teeth profile by induction hardening is manufactured, the amount of Cr is preferably 0.8 wt % or less with the intention of restricting the hardenability of the martensite phase (or the austenite phase when the steel material is in an induction heated condition) in which cementite is dispersed.

V, Cr, Mo and W, which have higher distribution coefficients $\alpha$KM between ferrite and cementite, can significantly concentrate in cementite, and $Fe_{21}Mo_2C_6$, $V_4C_3$ and WC special carbides exist like the presence of $Cr_7C_3$ carbide which has been described earlier in conjunction with Column (3). Therefore, these alloy elements have been studied like the case of $Cr_7C_3$ carbide, and it has been found that the V, Mo, W concentrations of cementite need to be adjusted to 0.3 wt %, 1 wt % and 1 wt % or more, respectively. Since addition of 0.1 wt % or more V, 0.3 wt % or more Mo and 0.5 wt % or more W causes a delay in the solid-dissolving of cementite, it is thought to be desirable for the invention that at least 0.3 wt % or more Cr and/or 0.1 wt % or more V be added and that Mo and W be added in combination if necessary.

If the amount of V exceeds 0.3 wt %, $V_4C_3$ carbide remains in the martensite parent phase after the induction hardening. Further, $V_4C_3$ exerts the above-described remarkable hard particle dispersion effect (up to 0.4% by volume). For these reasons, the amount of V is preferably within the range of 0.1 to 0.5 wt %.

Mn has a larger distribution coefficient $\alpha$KMn than V and Mo and concentrates to a remarkable extent in cementite, but does not cause a special carbide in the austenite state. Usually, steel contains up to 1.5 wt % Mn (which means cementite contains up to 8.5 wt % Mn). With this amount, the decrease of carbon activity caused by Mn addition which inhibits the outflow of carbon from cementite is obviously unnoticeable, and therefore a proper amount of Mn is 1.5 wt % or less. Where the steel material is used for producing a gear in which a quench hardened layer is formed along the teeth profile as described later, the amount of Mn is preferably 0.5 wt % or less in order to restrict the hardenability of the martensite phase.

The distribution coefficient $\alpha$KM between cementite and ferrite is based on steel sufficiently heated to 700° C. as noted earlier. If heating temperature is lowered to 600° C., the distribution coefficient becomes larger. Cr, Mn, V and Mo more actively concentrate in cementite. However, if heating time is too short, they do not sufficiently concentrate in cementite. Therefore, it is apparently advisable to pre-heat Cr, Mn, V and Mo at a temperature equal to or lower than the eutectoid temperature of the steel.

In addition, the cementite dispersing in the martensite parent phase of the rolling contact surface layer may be plate-like cementite having a pearlitic structure or coarse granular cementite (average particle diameter=1.5 to 3 μm) in view of rolling contact fatigue strength. In view of the strength of a gear or the like for withstanding bending stress and with the intention of avoiding cementite breakage by shot peening described later, it is advisable to finely granulate the cementite so as to have an average particle diameter of 1.5 μm or less as a pretreatment of the induction hardening. In the pretreatment for fining cementite particles, addition of an element having large distribution coefficients $\alpha$KM and $\gamma$KM is desirable and therefore it is advisable to add Cr which concentrate in cementite to a great extent.

In cases where the structure before the induction hardening is a spheroidal cementite structure, it is necessary to once form a deep martensite layer in order to carry out spheroidizing through refining of a raw material (quenching/tempering thermal treatment). This inevitably gives rise to a need for use of a steel having high hardenability, but it is desirable for the invention to employ a spheroidizing/annealing treatment. With this treatment, the time taken for the heating treatment can be markedly reduced particularly when Si and Al which significantly increase the eutectoid temperature (A1 temperature) of the steel are added to the steel in large amounts, because tempering temperature or spheroidizing temperature in refining can be increased.

In cases where the above rolling element is used as a gear, there is a possibility that the cementite may notch the inside of the gear, leading to a decrease in the bending fatigue strength of the roots of the teeth. To cope with this, the invention is arranged such that 1% by volume or more granular cementite having an average particle diameter of 0.1 to 1.5 μm is allowed to disperse in the rolling contact surface layer after the induction hardening; the notching action of the cementite is restricted; 10 to 60% by volume a retained austenite phase is formed to obtain increased toughness; the prior austenite grains are fined so as to have a particle diameter equal to or more than ASTM No. 10; and a compressive residual stress of 50 kgf/mm$^2$ or more is added. Further, mechanical processing treatment such as shot peening is applied to tooth surface layers each composed of a tooth top, a pitch circle, a tooth root and a tooth bottom, thereby reliably imparting a compressive residual stress of 50 kgf/mm$^2$ or more to the outermost surface portion of the rolling contact surface layer. Additionally, mechanical processing treatment such as shot peening is applied to the end faces of the teeth to prevent spalling damage occurring from the quenching boundaries of the end faces.

It is necessary for a gear susceptible to significant slip and damage such as scoring to increase lubricity by applying a lubricant to the rolling contact surface. Dispersion of cementite of a pearlitic structure within the martensite parent phase is convenient for forming oil pockets on the tooth flanks. In view of this, the invention provides a rolling element having good seizure resistance and wear resistance, in which the rolling contact surface contains at least pearlitic plate-like cementite. The oil pockets are oil pools formed in the martensite phase enclosed by the plate-like cementite that is harder than the martensite phase and contributes to an improvement in lubricity.

It is conceivable that a rolling element, in which pearlitic cementite disperses in the martensite parent phase, has a superior ability to damp vibration that occurs when the gears come into engagement with each other. Therefore, the rolling element of the invention is suitably used as a gear having a good damping ability. The pitting resistance of a rolling contact surface having a structure in which plate-like cementite of a pearlitic structure is dispersed in the martensite parent phase is superior to the pitting resistance of a rolling contact surface of a structure in which granular cementite is dispersed. This is apparently due to improved lubricity in the rolling contact surface. The rolling element containing pearlitic plate-like cementite dispersing in the martensite phase is also suited for use as a bearing member for high load. The scope of the invention covers such a rolling element.

When producing a rolling element through the above-described induction hardening, thermal homogenization is usually done within several seconds. Where the induction hardening is carried out with Cr, Mo, V, Mn etc. being condensed in the cementite, homogenization of the alloy elements in the martensite parent phase hardly progresses in many cases and, therefore, the temper softening resistance of the martensite parent phase decreases. As a result, there arises a possibility that the above-described particle dispersion effect of cementite upon rolling contact fatigue strength does not appear satisfactorily and the contact fatigue strength of the rolling element is not improved compared to carburized quenched rolling elements. To overcome this problem, the invention uses Si and Al which hardly concentrate in cementite but remain effectively in the martensite parent phase, increasing the temper softening resistance of the martensite parent phase. More specifically, the inventors have developed an induction-hardened rolling element which is made from a steel material containing 0.5 to 3.0 wt % Si, 0.25 to 1.5 wt % Al, or 0.5 to 3.0 wt % (Si+Al); and further containing one or more alloy elements selected from Mn, Ni, Cr, Mo, Cu, W, B, and Ca, unavoidable impurity elements such as P, S, N and O, and balance essentially consisting of Fe; the steel material being prepared so as to satisfy the relationship described by:

$$5 \leq 4.3 \times Si(wt\%) + 7.3 \times Al(wt\%) + 3.1 \times V(wt\%) + 1.5 \times Mo(wt\%) + 1.2 \times Cr(wt\%) \times (0.45 \div C(wt\%)), \text{ and}$$

which is produced by quenching or induction hardening the above steel material and then tempering it at 300° C. or less, such that a hardness of HRC 50 or more is ensured for a hardened surface layer after the tempering process at 300° C.

In the invention, since ferrite stabilizers such as Si and Al are added in large amounts, it is necessary to take account of the possibility that a ferrite phase remains in the quench hardened layer during the induction hardening. However, in the case of a steel containing 3 wt % Si, satisfactory austenitizing occurs at the heating temperature (900 to 1100° C.) of the induction hardening by adding 0.35 wt % or more carbon or, more preferably, 0.45 wt % or more carbon, as seen from FIG. 3. In the invention, if Al is added instead of Si, the upper limit of the amount of Al is preferably 1.5 wt %, because Al has a ferrite stabilizing ability twice stronger than that of Si.

In cases where coarse ferrite exists in a structure before the induction hardening, even if this pre-structure is a (ferrite+pearlite) structure, it is difficult to homogenize the (ferrite+pearlite) structure within a short time by the induction heating. Therefore, the steel material preferably contains the carbides or carbonitrides of Ti, V, Zr, Nb, Ta and Hf. It is also advisable to make the (ferrite+pearlite) structure small to restrict the generation of coarse ferrite and to adjust the carbon content of the steel material to 0.6 wt % or more.

The carbides, nitrides and/or carbonitrides of Ti, Zr, Nb, Ta and Hf hardly solid-dissolve in austenite during induction heating and are very hard compounds having good seizure resistance relative to steel, compared to cementite. Thus, a trace amount of one or more compounds selected from the above carbides, nitrides and carbonitrides promotes fining of austenite grains and exerts the above hard particle dispersion effect, substituting for cementite. In the invention, the upper limit of the amount of these compounds is set to 0.2 wt % in view of economical efficiency.

When TiC is used as the hard particles for example, 0.25 wt % TiC can be formed by addition of 0.2 wt % Ti, because the specific gravity of TiC is about 4.9 gr/cm$^3$. The volume percent of TiC (0.4% by volume) is so small that TiC is less likely to attack the mating member.

For effectively improving the seizure resistance and wear resistance of the rolling contact surface, it is advisable that the carbides, nitrides and/or carbonitrides which precipitately disperse in the steelmaking stage be comparatively large. The average particle diameter of the compounds is preferably 0.1 μm or more as seen from the distribution of high speed steel carbides. When taking account of the probability of attacking the mating member during the sliding movement of the rolling element, the average particle diameter is preferably 5 μm or less.

Mn, Cr and Mo significantly increase the hardenability of steel. In the case of steels having high carbon concentration (generally, 0.55 wt % or more), addition of these elements increases the risk of quench crack during the induction hardening. Also, they increase the hardening depth of a gear at its pitch circle position (i.e., the part of a gear through which the pitch circle passes) excessively, which may cause through hardening. If it happens, tensile residual stress will be generated on the tooth flank surfaces at the pitch circle position, resulting in a decrease in the strength of the tooth flanks. To solve this problem, the invention is arranged such that Cr, Mn and Mo are concentrated in the cementite by the above-described thermal spheroidizing treatment or by heating from the A1 temperature to 550° C. (this temperature range is in the two phase (ferrite+cementite) region), so that the Cr, Mn and Mo concentrations of the ferrite are largely lowered. With this, the hardenability of the austenite phase is markedly lowered, in which austenite only carbon is allowed to solid-dissolve in an amount of 0.25 wt % or more by heating in the course of the induction hardening, while leaving the cementite, so that at least through hardening of the gear at the pitch circle position is prevented to restrict occurrence of quench crack and generation of tensile residual stress. Further, the relationship between the gear module (M=the length of the pitch circle÷the number of teeth (mm)) and DI value (inch) is analyzed from thermal treatment calculation and the hardenability (DI value) of the austenite phase is determined so as to satisfy the condition described by DI≦0.12×M+0.2.

According to the above relationship, in the case of a gear having a gear module of 6 (M=6) for instance, an austenite phase having a hardenability (DI) of 0.92 (inch) or less is formed by induction heating. Thus, the hardenability of the austenite phase can be reduced by adjusting the alloy element concentration of the ferrite phase. In fact, the most common gears have modules of 6 or less (M≦6). In view of this, the invention is designed such that if the amount of soluble carbon contained in the martensite phase is 0.3 to 0.8 wt %, the martensite phase, which was previously a ferrite phase, preferably contains 0.05 to 0.2 wt % Cr; 0.1 to 0.3 wt % Mn; and 0 to 0.1 wt % Mo. For increasing the temper softening resistance of the steel at 350° C., it is desirable that the martensite phase contain 0.5 to 2 wt % Si and the DI value be adjusted to 0.92 or less.

More concretely, the invention uses a steel material at least containing 0.53 to 1.5 wt % C and unavoidably containing 0.3 to 1.5 wt % Cr and/or 0.1 to 0.3 wt % V. In this steel material, the amount of Mn is limited to 0.2 to 0.5 wt %, the amount of Si is adjusted to 0.5 to 2 wt % and the amounts of Mo and W are adjusted to the range of 0.2 wt % or less. In cases where importance is given to wear resistance and contact fatigue strength, it is preferable for the invention to use a steel material at least containing 1.2 to 1.5 wt % C and unavoidably containing 0.6 to 1.5 wt % Cr and/or 0.1 to 0.3 wt % V, in which the amount of Mn is limited to 0.2 to 0.5 wt %, the amount of Si is adjusted to 0.5 to 2 wt % and the amounts of Mo and W are adjusted to the range of 0.2 wt % or less.

Since the carbon content of the steel materials used for producing the rolling element and/or gear of the invention is high, it is apparent that machining of the rolling element and/or gear costs high. Above all, the element in which 0.6 wt % or more C is contained and a plate-like cementite having a pearlitic structure disperses is economically disadvantageous. To cope with this, a steel material containing 0.1 to 0.45 wt % carbon and having an alloy composition falling in the scope of the invention is subjected to carburizing treatment and/or carbonitriding treatment after machining, such that at least the carbon concentration of the surface is adjusted to 0.6 to 1.5 wt % and an area having a carbon concentration of 0.45 wt % extends 0.4 mm or more from the surface. Thereafter, the granular and/or pearlitic cementite is dispersed, Cr is condensed in the cementite, and then, the induction hardening is carried out to form a rolling element and/or gear. According to the invention, there is provided a rolling element which is made from a steel material containing at least 0.1 to 0.45 wt % C and one or more alloy elements selected from 0.1 to 0.5 wt % V and 0.3 to 1.5 wt % Cr, wherein the carbon concentration of a rolling contact surface is adjusted to 0.6 to 1.5 wt % by carburizing or carbonitriding treatment, wherein an area having a carbon concentration of 0.45 wt % extends 0.4 mm or more from the surface, and wherein the rolling contact surface layer has a structure tempered at low temperature in which 2 to 18% by volume cementite disperses in a martensite parent phase formed by induction hardening so as to contain 0.25 to 0.8 wt % solid-dissolving carbon. Preferably, the upper limit of the carbon concentration of the martensite parent phase is lower than the eutectoid carbon concentration of the steel material used or 0.6 wt %, similarly to the steel material described earlier. Cr condenses in the cementite like the steel material described earlier. In view of the depth of the maximum sheer stress when pressure is imposed on the rolling contact surface and its stress distribution, the depth of the aforesaid area having a carbon concentration of 0.45 wt % is determined to be 0.4 mm or more.

According to the invention, there is provided a method of producing a rolling element from a steel material containing at least 0.45 to 1.5 wt % C and one or more alloy elements selected from 0.1 to 0.5 wt % V and 0.3 to 1.5 wt % Cr, the method comprising:

a Cr incrassating treatment step for heating the steel material such that the average Cr concentration of cementite contained in the steel material becomes 2.5 to 10 wt %;

an induction hardening treatment step for induction heating the steel material from a temperature equal to or lower than the A1 temperature to a quenching temperature of 900 to 1100° C. within 10 seconds, followed by rapid cooling; and a tempering treatment step for heating the steel material to 100 to 300° C.

Accordingly, there has been developed a method of producing a rolling element having a low temperature tempered structure wherein 2 to 18% by volume cementite disperses in a martensite parent phase containing 0.25 to 0.8 wt % carbon solid-dissolving therein. In this method, the solid-dissolving of the cementite in the austenite is retarded by the Cr incrassating treatment step in which the steel material is heated such that the average Cr concentration of the cementite of the steel material becomes 2.5 to 10 wt % and by the induction hardening treatment step in which the steel material is induction heated from a temperature equal to or lower than the A1 temperature to a quenching temperature of 900 to 1100° C. within 10 seconds and rapid cooling is then carried out. In view of the above retardation and productivity, a sufficient time is assured for dispersion of carbon in the austenite phase. The Cr incrassating treatment step is comprised of a first heating treatment and/or a second heating treatment. The heating temperature of the first heating treatment is the A1 temperature to 900° C. in the two phase (cementite+austenite) region, whereas the heating temperature of the second heating treatment is 300° C. to the A1 temperature in the two phase (cementite+ferrite) region. The steel material contains at least 0.8 to 1.5 wt % C. Further, the method has a spheroidizing treatment step in which granular cementite having an average particle diameter of 0.1 to 1.5 μm is dispersed by slow cooling or cooling to a temperature equal to or lower than the A1 temperature and then reheating to a temperature equal to or higher than the A1 temperature, after the first heating treatment of the Cr incrassating treatment step in which the cementite is incrassated at a heating temperature of the A1 temperature to 900° C. in the two phase (cementite+austenite) region. Herein, "the rapid cooling" in the induction hardening treatment step is cooling carried out by use of a coolant (e.g., water, aqueous quenching agents and oil) having a cooling capacity necessary for austenitizing the surface layer of the rolling element heated to a specified temperature.

In order that the depth of induction heating from the surface of the gear is reduced as much as possible thereby to prevent through hardening of the gear at the pitch circle position and to form a quench hardened layer along the teeth profile, the method of the invention further has a preheating treatment step in which the steel material is preheated to 300° C. to the A1 temperature before the induction hardening treatment step, and the speed of heating from a temperature equal to or lower than the A1 temperature to a quenching temperature of 900 to 1100° C. in the induction hardening treatment step is set to 150° C./sec or more so that quench crack and quenching distortion at the time of the induction hardening are restricted.

According to the invention, there is provided a method of producing a rolling element from a steel material containing at least 0.1 to 0.45 wt % C and one or more alloy elements selected from 0.1 to 0.5 wt % V and 0.3 to 1.5 wt % Cr, the method comprising:

a carburizing or carbonitriding treatment step for adjusting the carbon concentration of a rolling contact surface to 0.6 to 1.5 wt % and adjusting the depth of an area having a carbon concentration of 0.45 wt % from the surface to 0.4 mm or more;

a Cr incrassating treatment step for heating the steel material such that the average Cr concentration of cementite contained in a carburized or carbonitrided layer becomes 2.5 to 10 wt % and/or a spheroidizing treatment step for dispersing granular cementite having an average particle diameter of 0.1 to 1.5 μm by slow cooling or cooling to a temperature equal to or lower than the A1 temperature and then reheating to a temperature equal to or higher than the A1 temperature;

an induction hardening treatment step for induction heating the steel material from a temperature equal to or lower than the A1 temperature to a quenching temperature of 900 to 1100° C. within 10 seconds, followed by rapid cooling; and a tempering treatment step for heating the steel material to 100 to 300° C.

With this method, a rolling element can be produced from a steel material having lower carbon content than that of the steel material described earlier, so that the economical efficiency of machining of a gear for instance can be improved. In addition, the need to provide expensive induction hardening equipment used for the above-noted rapid cooling is obviated, leading to an improvement in economical efficiency. Herein, the carbon concentration of the rolling contact surface is preferably in the range of 0.9 to 1.5 wt %.

The method may include a mechanical treatment step in which a compressive residual stress of 50 kgf/mm$^2$ or more is generated, by a treatment such as shot peening, in a part or the whole of the surface layer of the rolling element after the induction hardening treatment step. With this arrangement, the bending fatigue strength and pitting resistance of the surface layer of the rolling element can be increased.

The functions of the alloy elements employed in the above inventions will be collectively explained below.

Si: 0.5 to 3.0 wt %

Si is an element capable of markedly increasing the temper softening resistance in lower temperature tempering at 300 to 350° C. The mechanism of increasing the temper softening resistance is such that ε carbide which precipitates at lower temperatures is more stabilized and softening is prevented by raising cementite precipitation to a higher temperature region.

The lower limits of the amounts of Si and Al are determined in consideration of the following facts. Since the softening resistance ΔHRC of Si per gram in tempering at 300° C. is 4.3 and the base hardness in tempering at 300° C. obtained from 0.55 wt % carbon is HRC 47.6, the amount of Si for ensuring a hardness of HRC 50 in tempering at 300° C. is about 0.5 wt %. The amount of Al in the presence of 0.15 wt % Si is about 0.25 wt %.

The upper limit of the amount of Si is set to 3.0 wt % in order that the Ac3 transformation temperature does not exceed 900° C. when the above-noted carbon content is in the range of 0.3 to 0.8 w % and that induction hardening temperature does not increase needlessly. Where oil quenching is carried out after carburizing or carbonitriding, the carbon content of the steel material needs to be 0.2 to 0.8 wt %. In view of this, it is apparently preferable to restrict the upper limit of Si to 2 wt % in order to avoid excessively increased quenching temperature.

Al: 0.25 to 1.5 wt %

Al can be suitably used for cleaning steel material because it exerts a strong deoxidization action and actively eliminates P and S contained in steel as impurities from the grain boundary. In the invention, after confirming that Al is an element capable of increasing low temperature temper softening resistance more effectively (ΔHRC=7.3) than Si, the amount of Al when added alone is determined to be 0.25 to 1.5 wt %. Where part of Si is replaced with 0.15 to 1.5 wt % Al, the amount of (Si+Al) is set to 0.5 to 3.0 wt %. As noted earlier, Al is a stronger ferrite stabilizer than Si and raises the Ac3 temperature about 1.6 times higher than Si does. For this reason, the maximum amount of Al is set to 1.5 wt % (2.5 wt %/1.6). It is definitely preferable to restrict the upper limit of Al to 1 wt % lest quenching temperature excessively increases.

Ni:

It has been already reported in Japanese Patent Application No. 2002-240967 that remarkable toughness can be achieved by adding 0.3 to 2.5 wt % Ni in the presence of the above amount of Al. Above all, high-hardness martensitic structures containing 0.6 wt % or 1.2 wt % carbon possess excellent Charpy impact properties and Ni can dramatically improve the impact load resistance of gears. Therefore, Ni is useful as a gear material. However, Ni addition increases the cost of the steel material and therefore the amount of Ni is set to 1.5 wt % or less in the invention.

Cr:

Cr is an element capable of markedly increasing the hardenability of steel. Where the tooth flanks of a gear are quench-hardened by induction hardening, only the surface layer portion which has been heated to a temperature equal to or higher than the Ac3 transformation temperature by the induction heating may be rapidly cooled. Therefore, the hardenability (DI value) of steel used as a gear material does not need to be higher than the hardenability (DI value: 2.0 inches or more) of ordinary carbon steels. Where no cementite is dispersed in a steel material for gears as discussed earlier, the amount of Cr is often adjusted to 0.5 wt % or less in order to reduce the possibility of quench crack. Where cementite is dispersed by the above induction hardening technique, it is preferable to add 0.3 to 1.5 wt % Cr for the purpose of allowing fine cementite to remain. In this case, it is preferable that Cr be allowed to sufficiently concentrate in the cementite by spheroidizing the cementite and the solid-dissolving of the alloy element in the austenite formed during the induction heating be restricted thereby substantially limiting the hardenability of the austenite to restrain the possibility of occurrence of quench crack. It is also desirable to promote the dispersion of the cementite by addition of V which scarcely affects the hardenability of the steel thereby limiting the amount of Cr to 0.5 wt % or less.

Mn:

Mn is an element capable of not only exerting remarkable desulfurization but also significantly increasing the hardenability of steel as noted earlier. Therefore, it is used in proper amounts according to need. In the gear produced by the induction hardening, it is desirable that the amount of Mn be limited to 0.2 to 0.5 wt % in order to adjust the hardenability of the martensite phase, while positively adding 0.5 to 2 wt % Si to increase temper softening resistance.

Mo:

Mo is a useful element as it increases the hardenability of steel and restrains temper brittleness, and therefore it is desirable for the invention to add Mo in an amount of 0.35 wt % or less which is the same level as that of the ordinary case-hardened SCM steel. If 0.3 wt % or more Mo is added to the steel material of a rolling element to which the above-described induction hardening technique is applied, the solid-dissolving of the cementite into the austenite during the induction heating phase will be retarded. However, when considering the role and economical efficiency of Mo, it is obvious that Mo is not an indispensable alloy element. Therefore, the amount of Mo is limited to 0.2 wt % or less. W is substantially similar to Mo in this respect.

In cases where the tooth flanks of a gear are quench-hardened by the induction hardening technique, only the surface layer which has been heated to a temperature equal to or higher than the Ac3 transformation temperature by induction heating may be quench-hardened, and therefore the gear material does not need to have hardenability (DI value) higher than the hardenability (2.0 inches or more) of the ordinary carbon steel level. This means that inexpensive steel materials can be used. Therefore, it is more preferable for the invention that, the amounts of Mn and Cr be reduced and the amounts of alloy elements such as Si, Al, Ni, Mo and V be controlled to obtain a DI value of 2.0 inches or less.

As has been described above, the invention provides a rolling element which exhibits good seizure resistance at its rolling contact surface under a high interface pressure and further has enhanced pitting resistance.

BRIEF DESCRIPTION OF THE DRAWINGS

FIGS. 4(a), 4(b) are views of test specimens for use in a roller pitting test, wherein FIG. 4(a) shows a small roller test specimen whereas FIG. 4(b) shows a large roller test specimen.

FIGS. 10(a), 10(b) are photographs of high-speed induction hardened structures, in which FIG. 10(a) shows a quench hardened structure in which granular cementite is dispersed and FIG. 10(b) shows a quench hardened structure wherein pearlitic cementite is dispersed.

BEST MODE FOR CARRYING OUT THE INVENTION

Referring now to the accompanying drawings, rolling elements and the producing methods thereof will be hereinafter concretely described according to preferred embodiments of the invention.

Example 1

The Pitting Resistance of Quenched, Tempered Carbon Steels and Carburized, Quenched, Case-Hardened Steels (Preliminary Test)

Figure 1:
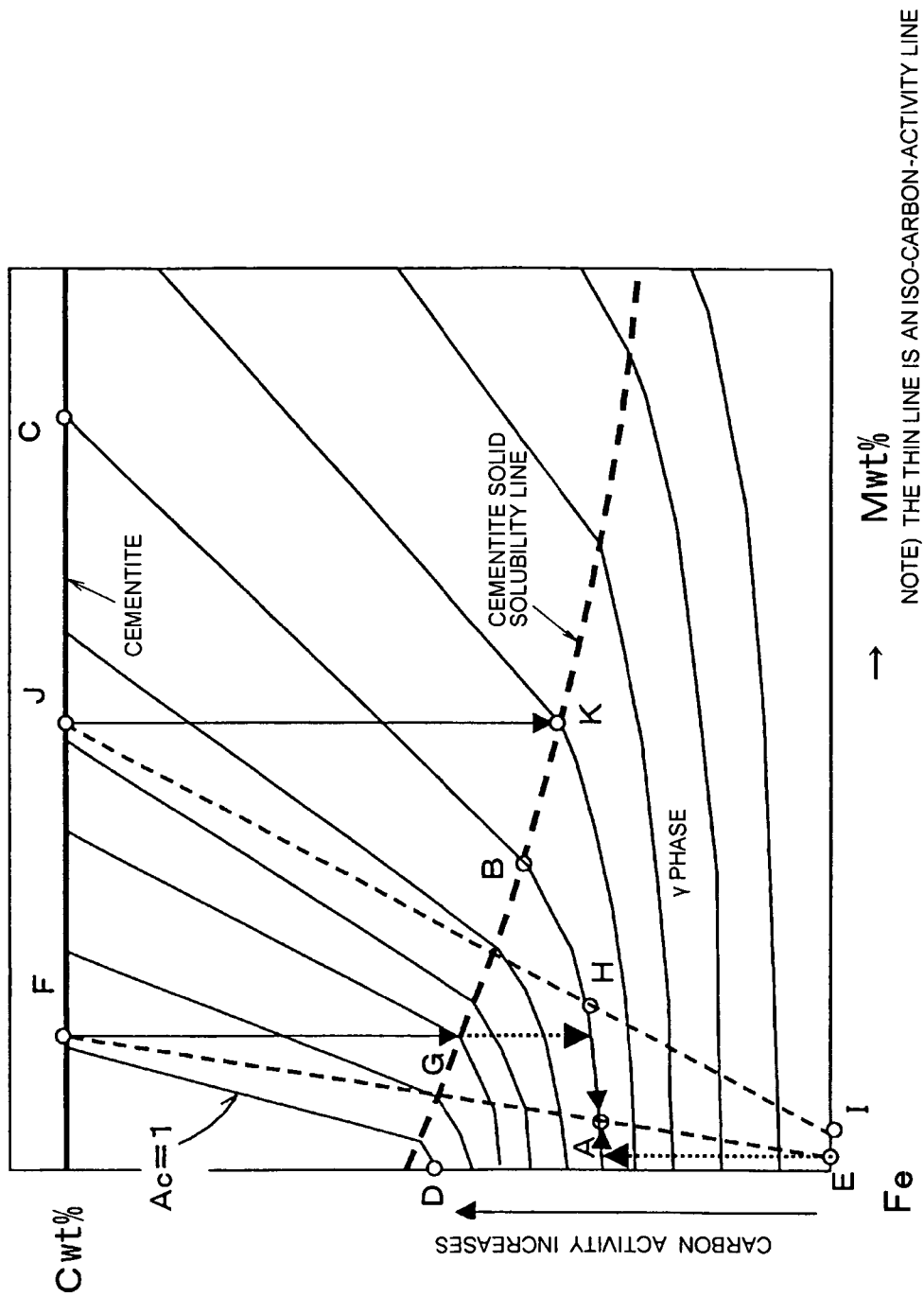
FIG. 1 is a γ phase solid-dissolving mechanism diagram combined with an Fe—C-M based steel phase diagram and an iso-carbon-activity graph.
Figure 2:
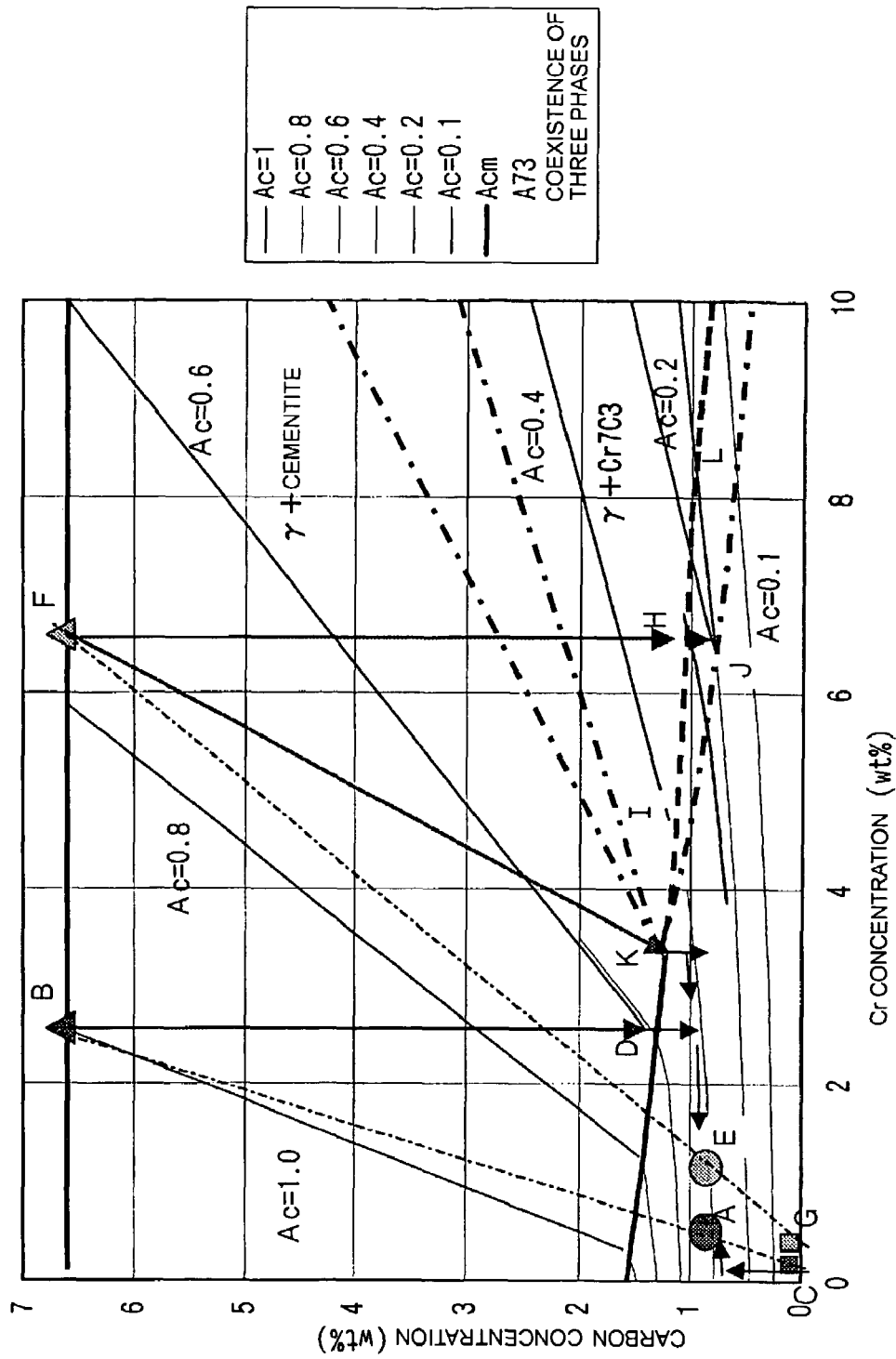
FIG. 2 is an Fe—C—Cr based steel iso-carbon-activity graph.
Figure 3:
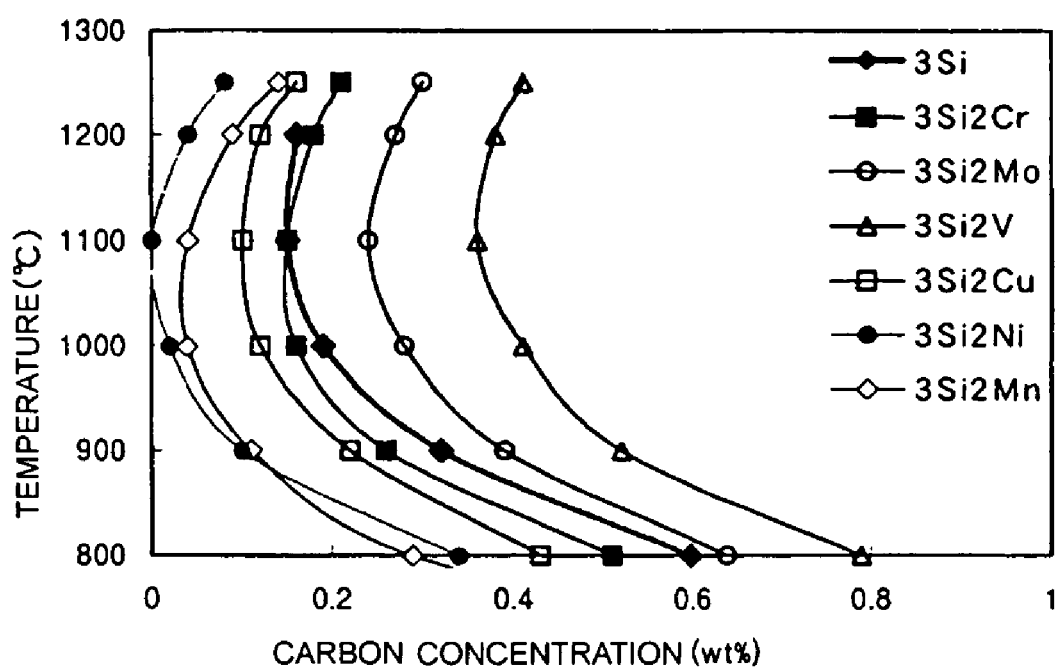
FIG. 3 is a phase diagram showing the influence of alloy elements upon Fe-3 wt % Si.
Figure 4:
Figure 4:
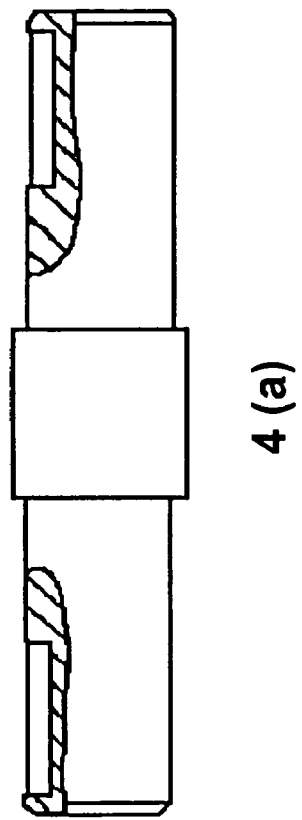

In this example, a roller pitting test was conducted using the test specimens shown in FIG. 4 and various quenched, tempered carbon steels and carburized, quenched, case-hardened steels were checked in terms of pitting resistance to investigate the rolling fatigue strength of the tooth flanks of gears under a sliding contact condition. Table 1 shows the chemical compositions of the various carbon steels and case-hardened steels used in this example. These steel materials were respectively shaped into the small rollers shown in FIG. 4(a) and the test specimens No. 1, 2 and 4 were further subjected to water quenching after heating at 820° C. for 30 minutes, and then tempered at 160° C. for 3 hours, followed by testing. The test specimen Nos. 3 and 4 were quench-hardened, at their rolling contact surfaces, using a 40 kHz high-frequency power source after thermal refining and then subjected to tempering as described above. No. 5 was cooled to 850° C. after carburization (carbon potential=0.8) at 930° C. for 5 hours. Then, it was kept at 850° C. for 30 minutes and quenched by a quenching oil having a temperature of 60° C., followed by the same tempering treatment as described above.

TABLE 1

|  | C | Si | Mn | Ni | Cr | Mo | NOTE |
|---|---|---|---|---|---|---|---|
| No. 1 | 0.55 | 0.23 | 0.71 |  |  |  | S55C |
| No. 2 | 0.77 | 0.21 | 0.74 |  |  |  | EUTECTOID CARBON STEEL (1) |
| No. 3 | 0.85 | 0.22 | 0.81 |  | 0.43 |  | EUTECTOID CARBON STEEL (2) |
| No. 4 | 0.98 | 0.27 | 0.48 |  | 1.47 |  | SUJ2 |
| No. 5 | 0.19 | 0.22 | 0.75 |  | 0.97 | 0.15 | SCM420H |

Figure 5:
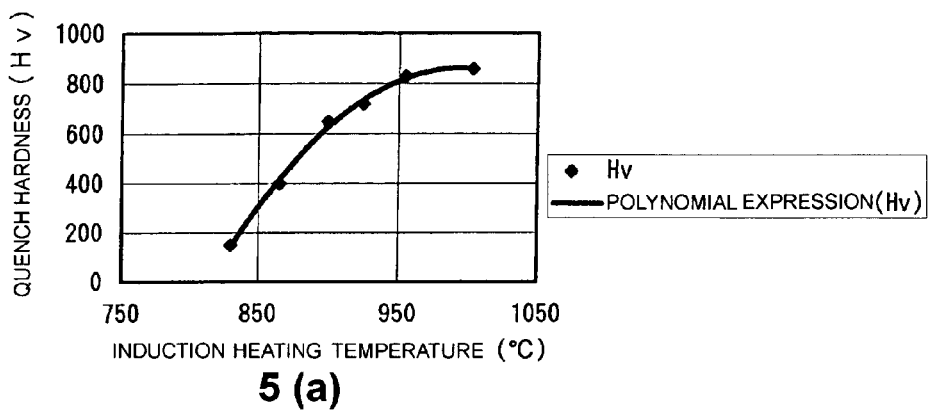
FIG. 5(a) is a graph showing the relationship between induction heating temperature and quench hardness.
FIG. 5(b) is a graph showing the relationship between induction heating temperature and the C concentration of martensite (6° C./sec)
FIG. 5(c) is a graph showing the relationship between induction heating temperature and the volume percent of a θ phase.
Figure 5:
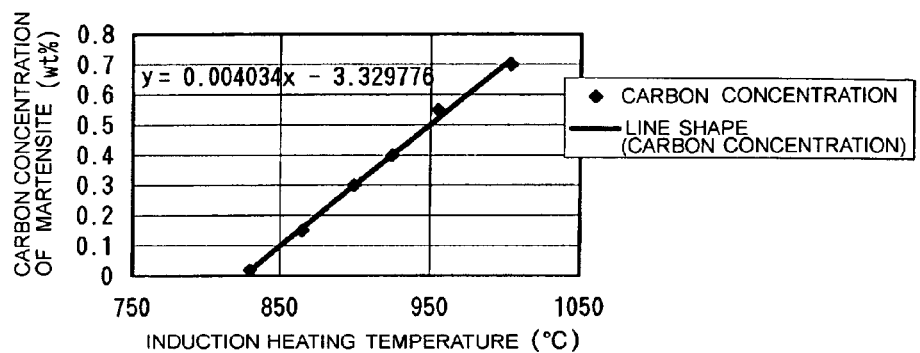
Figure 5:
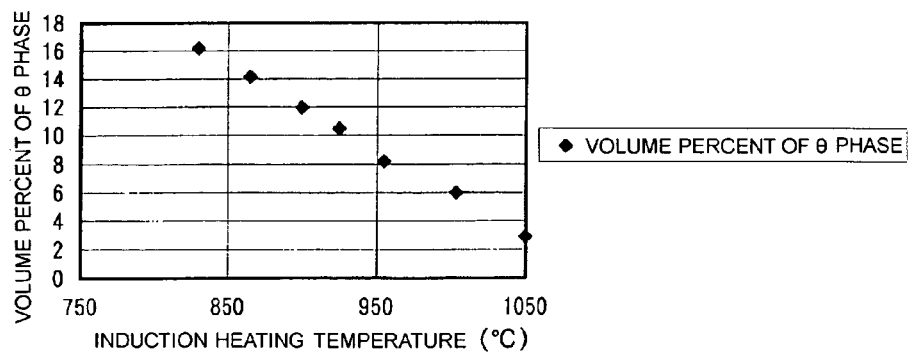

The spheroidized SUJ2 of the test specimen No. 4 was induction heated to a temperature range of 800° C. or more at a comparatively slow speed of 5° C./sec and kept at a specified heating temperature for about 5 sec. Thereafter, No. 4 was subjected to water quenching. The relationship between the carbon concentration of martensite and the amount of non-solid-dissolving cementite was checked from the hardness of the quenched layer of No. 4. FIGS. 5(a), 5(b) and 5(c) show the result of the check. As apparent from these graphs, the solid-dissolving of the cementite in the austenite is delayed by the condensation of Cr into the cementite, and heating temperature should be set to at least 900° C. or more in order to obtain martensite having satisfactory hardness. Even if heating temperature is raised to 1000° C., 6% by volume or more cementite will remain in a non-solid-dissolving state. Therefore, Nos. 3 and 4 were hardened at an induction hardening temperature of 950 to 980° C. and then tempered at 160° C. for 3 hours. The amount of the cementite remaining at that time was 2% by volume in the case of No. 3 and 10% by volume in the case of No. 4.

A large roller was prepared by applying water quenching to the SUJ2 material of No. 4 after heating at 820° C. for 30 minutes and then tempering it at 160° C. for 3 hours. The roller pitting test was carried out in such a way that the small and large (loaded) rollers were rotated at speeds of 1050 rpm and 292 rpm respectively, while being lubricated with #30 engine oil having a temperature of 70° C., and a load is imposed on the rollers with a slip ratio of 40% and interface pressures ranging from 375 to 220 kgf/mm².

Figure 6:
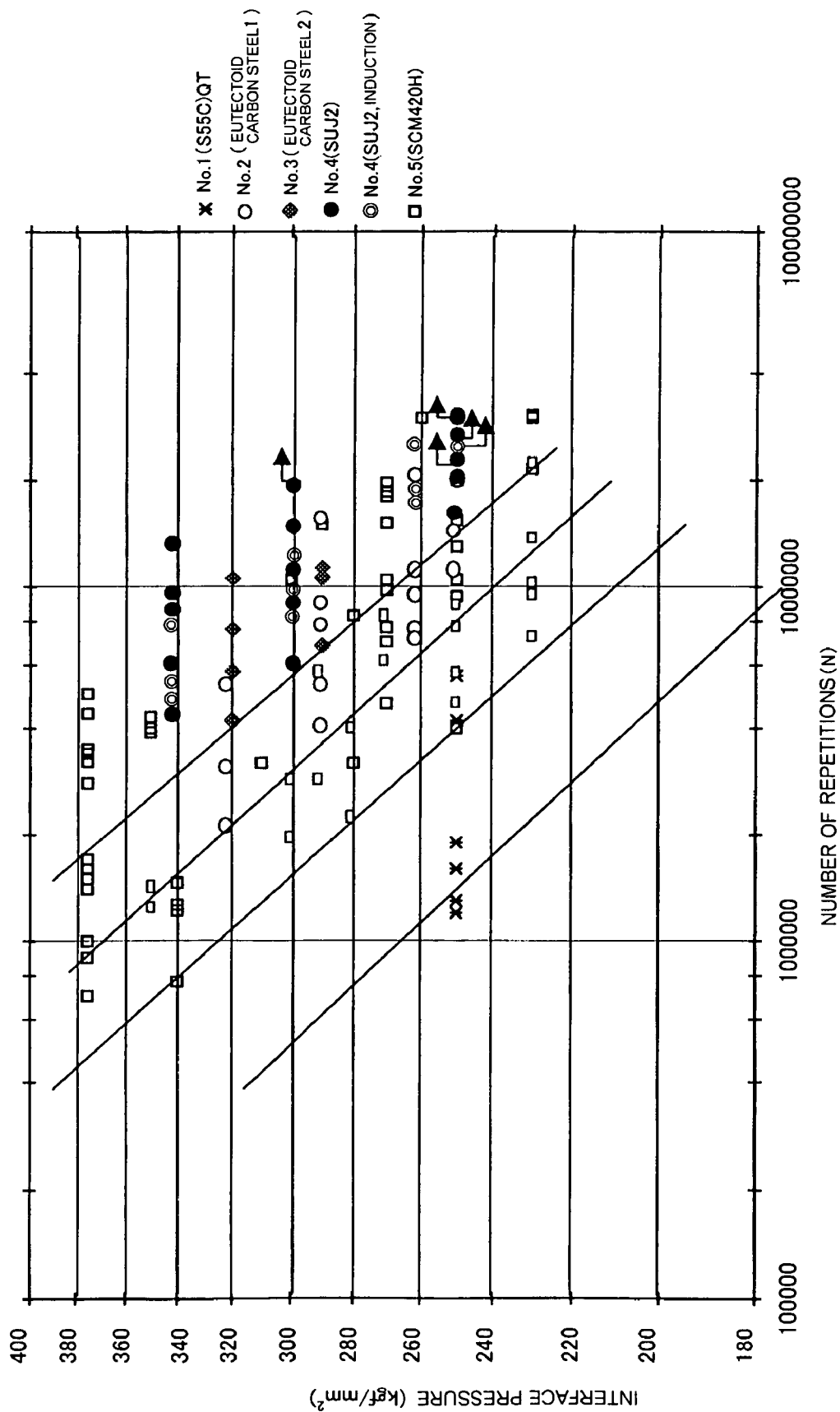
FIG. 6 is a graph showing the result of a preliminary test for checking roller pitting resistance.

FIG. 6 collectively shows the number of repetitions at which pitting occurred under each interface pressure. In FIG. 6, a lifetime line of the carburized case-hardened steel serving as a reference is indicated by solid line. This lifetime line is formed by connecting the minimum numbers of repetitions obtained when the carburized case-hardened steel was subjected to various interface pressures in the above range. On assumption that the interface pressure when the number of repetitions which causes occurrence of pitting is $10^7$ times is defined as rolling contact fatigue strength, the pitting resistance corresponding to it has been found to be about 210 kgf/mm². When the pitting resistance of each test specimen was checked in the same way, it was found that No. 1=175 kgf/mm², No. 2=240 kgf/mm², No. 3 (induction hardening)= 260 kgf/mm², No. 4=270 kgf/mm² and No. 4 (induction hardening)=290 kgf/mm². It can be understood from this result that Nos. 3 and 4, in which cementite particles are dispersed in amounts of about 2% by volume and about 10% by volume, respectively, by induction hardening are significantly improved in rolling contact fatigue strength. Also, it can be understood that the pitting resistance of the carburized case-hardened steel varies to a somewhat large extent because of intergranular oxidation which occurred during the carburization of the rolling contact surface, the presence of a slack quenched layer, and a large amount of retained austenite. It was found from the comparison in terms of the average number of repetitions which caused pitting that the pitting resistance of the carburized case-hardened steel does not differ from that of the test specimen No. 2.

The X-ray half value width of the martensite phase of the rolling contact surface of each test specimen in which pitting had occurred was checked. As a result, it was found that No. 1=3.6 to 4.0°, No. 2=4 to 4.2°, No. 3=4.2 to 4.4°, No. 4=4.3 to 4.6° and No. 5=4 to 4.2°.

Further, the test specimen Nos. 1 to 5 which had undergone the above-described thermal treatment were tempered at 250 to 350° C. for 3 hours and then, the X-ray half value width of the rolling contact surface of each test specimen in which pitting had occurred was checked. As a result, the half value width of each specimen under the above condition was found to be substantially coincident with the half value width when tempering was carried out at 300° C. This result substantially coincides with the relationship between the temper hardnesses and half value widths of carbon steels having various carbon concentrations which is reported in "Material" Vol. 26, No. 280, P26.

Example 2

Checking of Temper Softening Resistance

Table 2 shows the alloy compositions employed in this example. Thermal treatment was carried out in such a way that after heated at 810 to 870° C. for 30 minutes, each test specimen was subjected to water cooling and then tempering at 300° C. and 350° C. for 3 hours. Thereafter, the Rockwell hardness HRC of each test specimen was checked and the effect of addition of each alloy element on the hardness was analyzed.

TABLE 2

| TPNo. | C | Si | Al | Mn | Ni | Cr | Mo | V | B |
|---|---|---|---|---|---|---|---|---|---|
| No. 6 | 0.45 | 1.45 | | 0.46 | | 1.49 | 0.52 | 0.14 | 0.0018 |
| No. 7 | 0.49 | 1.45 | | 0.46 | | 1.01 | 1.03 | 0.15 | 0.0019 |
| No. 8 | 0.47 | 0.31 | | 0.46 | | 2.01 | 1.03 | 0.15 | 0.0019 |
| No. 9 | 0.49 | 0.29 | | 0.45 | | 1.5 | 1.49 | 0.23 | 0.0019 |
| No. 10 | 0.36 | 1.77 | | 0.6 | | 0.62 | 0.11 | | 0.0026 |
| No. 11 | 0.45 | 0.95 | | 0.66 | 0.01 | 1.29 | 0.5 | | 0.0029 |
| No. 12 | 0.39 | 0.93 | | 1.02 | 0.08 | 0.97 | 0.95 | 0.5 | |
| No. 13 | 0.43 | 0.26 | | 0.44 | | 1.01 | 0.48 | | 0.001 |
| No. 14 | 0.47 | 0.25 | | 0.4 | | 1.01 | 1.05 | | 0.0018 |
| No. 15 | 0.46 | 1.5 | | 0.4 | | 1 | 0.51 | | 0.002 |
| No. 16 | 0.45 | 0.24 | | 0.4 | | 1.02 | 0.48 | 0.31 | 0.0011 |
| No. 17 | 0.45 | 1.46 | | 0.39 | | 0.96 | 0.98 | | 0.001 |
| No. 18 | 0.41 | 0.25 | | 0.35 | | 1 | 0.49 | | 0.0017 |
| No. 19 | 0.52 | 2.3 | | 0.57 | | 0.11 | | | |
| No. 20 | 0.98 | 0.27 | | 0.48 | | 1.47 | | | |
| No. 21 | 0.55 | 0.23 | | 0.71 | | | | | |
| No. 22 | 0.77 | 0.21 | | 0.74 | | | | | |
| No. 23 | 0.45 | 0.21 | 1.26 | 0.53 | | 1.51 | 0.21 | | |
| No. 24 | 0.6 | 0.25 | 0.97 | 0.93 | 0.98 | 1.04 | 0.35 | | |

In a preliminary experiment, the hardness of a carbon steel containing 0.1 to 1.0 wt % carbon and 0.3 to 0.9 wt % Mn was checked and utilized as base data for the analysis of the effect of each alloy element. As a result, it was found that the hardnesses of the steel was approximated by the following equations.

$$HRC = 34 \times \sqrt{C(\text{wt \%})} + 26.5 \text{ (tempering temperature} = 250° \text{ C.)}$$

$$HRC = 36 \times \sqrt{C(\text{wt \%})} + 20.9 \text{ (tempering temperature} = 300° \text{ C.)}$$

$$HRC = 38 \times \sqrt{C(\text{wt \%})} + 15.3 \text{ (tempering temperature} = 350° \text{ C.)}$$

After analyzing the effect of each alloy element based on the hardnesses of the carbon steel noted above, it was found that the temper softening resistance ΔHRC in the case of tempering at 300° C. for instance could be described by the following equation.

$$\Delta HRC = 4.3 \times Si(\text{wt \%}) + 7.3 \times Al(\text{wt \%}) + 1.2 \times Cr(\text{wt \%}) \times (0.45 \div C(\text{wt \%})) + 1.5 \times Mo(\text{wt \%}) + 3.1 \times V(\text{wt \%})$$

It was found from this result that Al exhibited temper softening resistance 1.7 times higher than that of Si and was therefore extremely effective as an element for increasing rolling contact fatigue strength.

Figure 7:
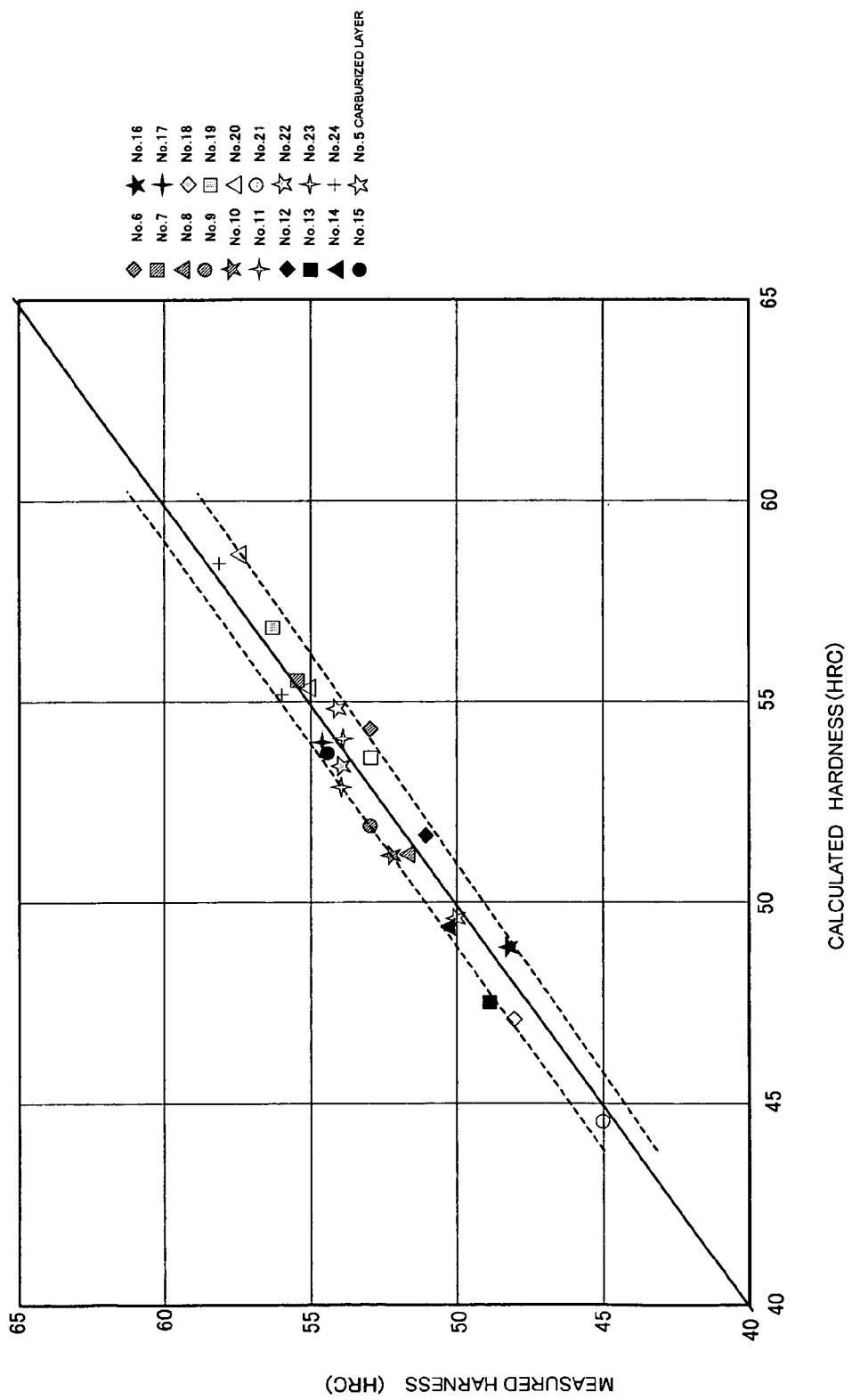
FIG. 7 is a graph showing the comparison between measured values and calculated values of temper hardness.

FIG. 7 shows the degree of coincidence between the temper hardness obtained from the result of the above analysis and the temper hardness obtained from an actual measurement. It will be understood from FIG. 7 that temper hardness can be accurately estimated with a tolerance of HRC±1. The 300° C.-temper hardness of the carburized layer (0.8 wt % carbon) of SCM420 (No. 5) of Example 1 is indicated by mark ☆ in FIG. 7 and well coincident with the calculated value.

Example 3

An Improvement in Pitting Resistance by Use of Steel Material Having Excellent Temper Softening Resistance—1

Table 3 shows the alloy compositions of the steel materials used in this example. After induction hardened under the same induction heating condition as in Example 1, each test specimen was tempered at 160° C. for 3 hours and then subjected to a roller pitting test.

ment to SCM420 so as to have a surface hardness of HRC60 was used. The pressure applied to the test specimens was increased 25 kgf/cm$^2$ at a time after held at the same level for 5 minutes, and the pressure (kgf/cm$^2$) at which the friction coefficient suddenly rose (i.e., a seized state) was measured.

The sliding test specimens of the invention shown in Table 3 were subjected to the same induction hardening and tempering treatment as of Example 3. A comparative material (SCM420+GCQT) prepared by applying carburizing/quenching/tempering treatment to SCM420 was used. Also, comparative materials (SCM 440+QT), (S55C+QT), and (SUJ2+QT) prepared by applying quenching/tempering treatment to SCM44040, S55C and SUJ2 respectively were used.

The result of the friction test is also shown in Table 3 from which it is clearly understood that the seizure resistance of Nos. P1 to P5 was markedly improved by the dispersion effect of the hard particles. Above all, the effect of Ti addition upon the improvement of the seizure resistance is marvelous.

TABLE 3

| | C | Si | Al | Mn | Ni | Cr | Mo | V | Ti | VOLUME PERCENT OF CEMENTITE | INTERFACE PRESSURE THAT CAUSES SEIZURE |
|---|---|---|---|---|---|---|---|---|---|---|---|
| No. P1 | 0.58 | 0.21 | 0.024 | 0.41 | | 0.46 | | | | 2 | 350 |
| No. P2 | 0.63 | 0.58 | 0.021 | 0.38 | | | | 0.46 | | 2 | 350 |
| No. P3 | 0.61 | 0.25 | 1.47 | 0.93 | 0.98 | 1.04 | 0.35 | | | 3 | 400 |
| No. P4 | 0.83 | 1.01 | 0.31 | 0.55 | | 0.96 | 0.38 | | | 5 | 375 |
| No. P5 | 0.73 | 0.71 | 0.028 | 0.46 | | 0.49 | | | 0.19 | 4 | 425 |
| SCM420 + GCQT | | | | | | | | | | | 300 |
| SCM440 + QT | | | | | | | | | | | 275 |
| SUJ2 + QT | | | | | | | | | | | 400 |
| S55C + QT | | | | | | | | | | | 275 |

Figure 8:
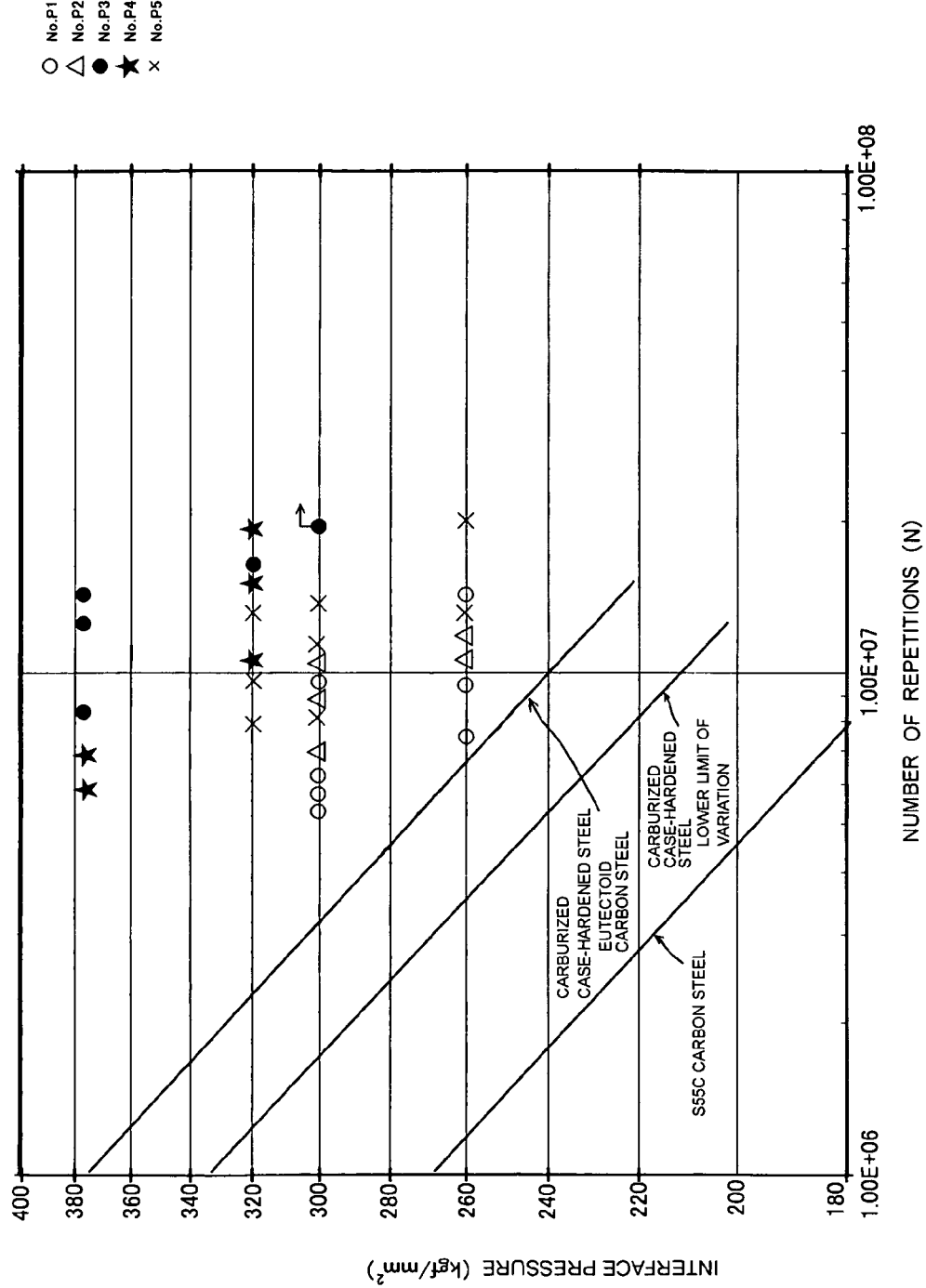
FIG. 8 is a graph showing the pitting resistance of rolling elements produced according to the invention.

The dispersion amount of the cementite contained in the rolling contact surface layer of each test specimen is also written in Table 3. The test for checking pitting resistance was carried out under substantially the same condition as in Example 1 and the test result is shown in FIG. 8. The pitting occurrence line obtained in Example 1 is indicated by solid line in FIG. 8, whereas the pitting occurrence line obtained in Example 3 is indicated by solid line in FIG. 7.

It was found from the above result that the pitting resistance of the rolling contact surface could be dramatically improved by the cementite particles dispersion effect and sole-addition or co-addition of Al, Si, V and Ti.

Example 4

An Improvement in Sliding Properties by Dispersion Of Carbides, Nitrides and Carbonitrides—1

Figure 9:
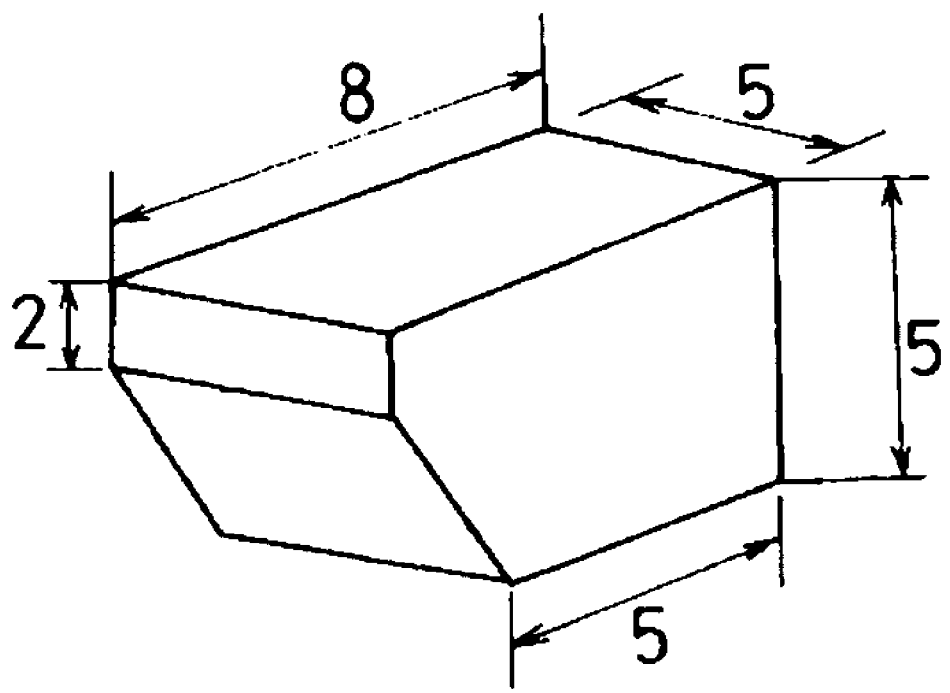
FIG. 9 shows a shape of a test specimen for use in a constant-speed friction test.

In this example, constant speed friction test specimens such as shown in FIG. 9 were prepared from the same steel materials as of Example 3. A constant speed friction test was conducted on these test specimens being lubricated with an engine oil #30 having a temperature of 80° C. In this test, peripheral velocity was 10 m/sec and a mating member prepared by applying carburizing/quenching/tempering treat- Example 5

Improvement of Wear Resistance

It is well known that induction hardened rolling elements usually do not have satisfactory wear resistance. In this example, the effect of cementite dispersion upon the wear resistance is evaluated by the same roller pitting test as of the forgoing examples. The roller pitting test was carried out in the same way as described earlier and the abrasion amount of each test specimen was evaluated by measuring the abrasion depth (μm) of a small roller which had been rotated 2×10$^6$ times in the test. In this test, the steels shown in Table 4 were used as test specimens. After induction hardening, these test specimens were checked in terms of the amount of cementite, the amount of retained austenite and the amount of abrasion which are collectively shown in Table 4. It is apparent from Table 4 that the dispersion of cementite causes a remarkable improvement in wear resistance. In the case of No. W3, the structure in which pearlitic plate-like cementite disperses has higher wear resistance than that of the structure in which granular cementite disperses, for the reason that the lubricating condition of the rolling contact surface under a rolling/sliding condition has been improved by formation of oil pockets on the rolling contact surface. This structure is applicable not only to gears but also to rolling elements such as bearings.

TABLE 4

| | C | Si | Al | Mn | Ni | Cr | Mo | VOLUME PERCENT OF CEMENTITE | ABRATION AMOUNT (μm) | VOLUME PERCENT OF RETAINED AUSTENITE |
|---|---|---|---|---|---|---|---|---|---|---|
| No. W1 | 0.46 | 0.22 | 0.018 | 0.76 | | 0.8 | | 1.2 (GRANULAR) | 4.1 | 12 |
| No. W2 | 0.53 | 0.21 | 0.021 | 0.78 | | 0.98 | 0.16 | 2.5 (GRANULAR) | 2.3 | 17 |
| No. W3 | 0.98 | 0.55 | 0.023 | 1.11 | | 1.08 | | 5.8 (GRANULAR) | 0.9 | 35 |
| No. W3 | | | | | | | | 6.2 (PEARLITIC) | 0.4 | 28 |
| No. W4 | 0.84 | 1.12 | 0.019 | 0.4 | | 0.91 | | 5.8 (PEARLITIC) | 0.7 | 33 |
| No. W5 | 0.5 | 0.88 | 0.022 | 0.75 | | 0.12 | | 0 | 8.9 | 7 |
| S55C | 0.55 | 0.23 | 0.025 | 0.71 | | | | 0 | 12 | 5 |
| S80C | 0.79 | 0.22 | | 0.75 | | 0.13 | | 0 | 7.3 | 12 |
| CARBURIZED QUENCHED SCM420 | | 0.23 | 0.024 | 0.78 | | 1.01 | 0.17 | 0 | 3.8 | 23 |

FIGS. 10(a), 10(b) show the structures of the rolling contact surface of the test specimen No. W3 shown in Table 4. The structure shown in FIG. 10(a) is obtained by spheroidizing No. W3, whereas the one shown in FIG. 10(b) is obtained by cooling No. W3 after held at 820° C. for 1.5 hours, then heating it to 1000° C. at a heating speed of 1000° C./sec (this speed is much higher than the normal induction heating speed), followed by quenching. It is obvious that, in the structure shown in FIG. 10(b), pearlitic plate-like cementite disperses in the martensite parent phase due to the influence of the structure before quenching.

The result of a survey on the Cr concentrations of pearlitic cementite and granular cementite is shown in Table 10. In the pearlitic cementite, Cr condenses in an amount of up to 3.9 wt % which meets the requirements for formation of sufficient retained cementite by induction hardening described earlier. The average Cr concentration of the cementite of the steel having the structure shown in FIG. 10(b) was checked by electrolytic extraction and found to be 6.32 wt %.

Further, the relationship between the heating speed at which pearlitic plate-like cementite disperses and quenching temperatures (900° C., 950° C., 1000° C.) was checked, using the steel material No. W3 containing pearlitic plate-like cementite. As a result, dispersion of pearlitic plate-like cementite was observed even in a quenched structure (heating speed=150° C./sec, quenching temperature=900° C.) and the quench hardened layer of this structure was markedly hardened to Hv 945. It can be understood that where the lower limit of quenching temperature is 850° C., at least a heating speed of 100° C./sec or more is necessary for stable dispersion of pearlitic plate-like cementite in a martensite parent phase and that a preferable heating speed is 150° C./sec or more and a preferable quenching temperature is 900° C. or more.

What is claimed is:

1. A case-hardened gear which is made from a steel material comprising 0.45 to 1.5 wt % C and 0.3 to 1.5 wt % Cr, and optionally including 0.1 to 0.5 wt % V, said steel material containing cementite ((Fe, Cr)3C) dispersed therein, wherein an average Cr concentration in said cementite is 2.5 to 10 wt %, and said gear having a rolling contact surface layer having a case-hardened layer being formed by induction heating from a temperature equal to or lower than the A1 temperature to a quenching temperature of 900 to 1100° C. and subsequent cooling of said rolling contact surface layer, said case-hardened layer having a structure tempered at a low temperature of 100 to 300° C. in which 2 to 18% by volume of the cementite containing solid-dissolved Cr therein is dispersed in a martensite parent phase, said martensite parent phase containing 0.25 to 0.8 wt % solid-dissolved carbon, wherein the cementite dispersed in the rolling contact surface layer is substantially granulated and the cementite has an average particle diameter of 0.1 to 1.5 μm.

2. The case-hardened gear according to claim 1, wherein the cementite dispersed in the rolling contact surface layer has at least a portion thereof in a pearlitic structure.

3. The case-hardened gear according to claim 1, wherein the rolling contact surface layer contains 10 to 60% by volume retained austenite.

4. The case-hardened gear according to claim 1, wherein said gear is made from a steel material having substantially the same composition as that of the rolling contact surface layer, the rolling contact surface layer being subjected to induction hardening so as to have a parent phase of a martensitic structure in which prior austenite grains are refined to a size equal to or higher than ASTM grain size No. 10.

5. The case-hardened gear according to claim 1, which is made from a steel material further containing (i) 0.5 to 3.0 wt % Si, 0.25 to 1.5 wt % Al, or 0.5 to 3.0 wt % (Si+Al); and (ii) one or more alloy elements selected from the group consisting of Mn, Ni, Mo, Cu, W, B and Ca, and the balance being Fe and unavoidable impurity elements.

6. The case-hardened gear according to claim 5, wherein the steel material comprises 0.3 to 1.5 wt % Ni and 0.25 to 1.5 wt % Al.

7. The case-hardened gear according to claim 1, which is made from a steel material containing at least 0.05 to 0.2 wt % in total of one or more alloy elements selected from the group consisting of Ti, Zr, Nb, Ta and Hf, and carbides of said alloy elements, said carbides having an average particle diameter of 0.1 to 5 μm and are dispersed within the steel material, wherein the rolling contact surface layer contains 0.5 to 1.5 wt % C in said rolling contact surface layer, the rolling contact surface layer having a martensite parent phase tempered at a low temperature after quenching.

8. The case-hardened gear according to claim 1 which has teeth, wherein there is a relationship between a DI value in inches indicating the hardenability of a martensite phase and a gear module M, wherein M is a value obtained by the pitch diameter divided by the number of teeth of said gear, which satisfies the following relationship: DI≦0.12×M+0.2, said martensite phase being previously a ferrite phase and containing 0.25 to 0.8 wt % solid-dissolved carbon.

9. The case-hardened gear according to claim 8, wherein said steel material further contains 0.2 to 0.5 wt % Mn, 0.5 to 2 wt % Si, 0.2 wt % or less Mo, and 0.2 wt % or less W.

10. The case-hardened gear according to claim 8, wherein said steel material contains 1.2 to 1.5 wt % C and 0.6 to 1.5 wt % Cr, and wherein said steel material further contains 0.2 to 0.5 wt % Mn, 0.5 to 2 wt % Si, 0.2 wt % or less Mo, and 0.2 wt % or less W.

11. The case-hardened gear according to claim 8, wherein a compressive residual stress of 50 kgf/mm$^2$ or more remains at least on the surfaces of the roots of the teeth.

12. The case-hardened gear according to claim 11, wherein a compressive residual stress of 50 kgf/mm$^2$ or more is allowed to remain on tooth profile surface layers each comprising a tooth top, a pitch circle position, a tooth root and a tooth bottom, by a mechanical processing means which is shot peening for generating said compressive residual stress.

13. The case-hardened gear according to claim 11, wherein a compressive residual stress of 50 kgf/mm$^2$ or more is allowed to remain on surface layers at the ends of the teeth by a mechanical processing means which is shot peening for generating said compressive residual stress.

14. A method of producing a case-hardened gear from a steel material containing 0.45 to 1.5 wt % C and 0.3 to 1.5 wt % Cr, and optionally including 0.1 to 0.5 wt % V, the method comprising:
  (a) a Cr concentration treatment step for heating the steel material at 300° C. to the A1 temperature in a two phase (cementite+ferrite) region such that an average Cr concentration of cementite dispersed in the steel material is 2.5 to 10 wt %;
  (b) an induction hardening treatment step for induction heating the steel material from a temperature equal to or lower than the A1 temperature to a quenching temperature of 900 to 1100° C. within 10 seconds, followed by rapid cooling; and
  (c) a tempering treatment step for heating the steel material to 100 to 300° C.

15. The method of producing a case-hardened gear according to claim 14, wherein the speed of heating from a temperature equal to or lower than the A1 temperature to a quenching temperature of 900 to 1100° C. in the induction hardening treatment step is set to 150° C./sec or more.

16. The method of producing a case-hardened gear according to claim 14, further comprising a mechanical treatment step in which a compressive residual stress of 50 kgf/mm$^2$ or more is generated by a treatment which is shot peening, in a part or the whole of the rolling contact surface layer of the gear after the induction hardening treatment step.

17. The case-hardened gear according to claim 1, wherein the steel material includes 0.1 to 0.5 wt % V.

18. The method of producing a case-hardened gear according to claim 17, wherein the steel material includes 0.1 to 0.5 wt % V.

19. A method of producing a case-hardened gear from a steel material containing 0.8 to 1.5 wt % C and 0.3 to 1.5 wt % Cr, and optionally including 0.1 to 0.5 wt % V, the method comprising:
  (a) a Cr concentration treatment step for heating the steel material at the A1 temperature to 900° C. in a two phase (cementite+austenite) region such that an average Cr concentration of cementite dispersed in the steel material is 2.5 to 10 wt %;
  (b) an induction hardening treatment step for induction heating the steel material from a temperature equal to or lower than the A1 temperature to a quenching temperature of 900 to 1100° C. within 10 seconds, followed by rapid cooling; and
  (c) a tempering treatment step for heating the steel material to 100 to 300° C.

20. The method of producing a case-hardened gear according to claim 19, which further comprises carrying out a spheroidizing treatment step after the Cr concentration treatment step, wherein in the spheroidizing treatment step, granular cementite having an average particle diameter of 0.1 to 1.5 μm is dispersed by cooling to a temperature lower than the A1 temperature and then reheating to a temperature equal to or higher than the A1 temperature.

21. The method of producing a case-hardened gear according to claim 19, which further comprises a preheating treatment step in which the steel material is preheated at 300° C. to the A1 temperature before the induction hardening treatment step, and wherein the speed of heating from a temperature equal to or lower than the A1 temperature to a Quenching temperature of 900 to 1100° C. in the induction hardening treatment step is set to 150° C./sec or more.

22. The method of producing a case-hardened gear according to claim 19, further comprising a mechanical treatment step in which a compressive residual stress of 50 kgf/mm$^2$ or more is generated by a treatment which is shot peening, in a part or the whole off the rolling contact surface layer of the gear after the induction hardening treatment step.

23. The method of producing a case-hardened gear according to claim 19, wherein the steel material includes 0.1 to 0.3 wt % V.

* * * * *